United States Patent
Serizawa et al.

(10) Patent No.: US 8,402,220 B2
(45) Date of Patent: Mar. 19, 2013

(54) STORAGE CONTROLLER COUPLED TO STORAGE APPARATUS

(75) Inventors: Kazuyoshi Serizawa, Tama (JP); Kenta Shiga, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 252 days.

(21) Appl. No.: 12/682,056

(22) PCT Filed: Mar. 18, 2010

(86) PCT No.: PCT/JP2010/001964
§ 371 (c)(1),
(2), (4) Date: Apr. 8, 2010

(87) PCT Pub. No.: WO2011/114379
PCT Pub. Date: Sep. 22, 2011

(65) Prior Publication Data
US 2012/0005668 A1    Jan. 5, 2012

(51) Int. Cl.
*G06F 12/16* (2006.01)
(52) U.S. Cl. ............. 711/118; 711/152; 711/E12.021
(58) Field of Classification Search ............. 711/113, 711/118, 119, 152, E12.021, E12.019, E12.095
See application file for complete search history.

(56) References Cited

U.S. PATENT DOCUMENTS

| 5,175,842 | A | 12/1992 | Totani | |
|---|---|---|---|---|
| 7,062,608 | B2 * | 6/2006 | Le Moal et al. | 711/138 |
| 7,613,876 | B2 | 11/2009 | Bruce et al. | |
| 7,644,204 | B2 * | 1/2010 | Marripudi et al. | 710/40 |
| 8,275,965 | B2 * | 9/2012 | Yamamoto et al. | 711/170 |
| 2003/0028728 | A1 * | 2/2003 | Ito | 711/118 |
| 2008/0307120 | A1 | 12/2008 | Ogawa et al. | |

FOREIGN PATENT DOCUMENTS

| EP | 1 691 293 A1 | 8/2006 |
|---|---|---|
| EP | 1 705 574 A2 | 9/2006 |
| JP | 2008-305288 A | 12/2008 |

* cited by examiner

*Primary Examiner* — Pierre-Michel Bataille
(74) *Attorney, Agent, or Firm* — Mattingly & Malur, P.C.

(57) ABSTRACT

A storage controller comprises a cache storage used as a cache of an external storage and a control processor coupled to the cache storage. The control processor comprises an internal access function and an external access function. The internal access function transmits a read command to the cache storage. The cache storage determines whether the read target data complying with the read command is stored in a physical storage device or not. If the result of the determination is negative, the external access function is executed while, if the result of the determination is positive, the external access function is not executed because the cache storage transmits the read target data to the internal access function without issuing a request to the external access function.

14 Claims, 39 Drawing Sheets

STORAGE CONTROLLER COUPLED TO STORAGE APPARATUS

TECHNICAL FIELD

This invention relates to control of access to data.

BACKGROUND ART

As a storage apparatus, for example, a device (e.g., a disk array device) comprising a number of physical storage devices (e.g., HDDs (Hard Disk Drives)) is well known. This type of storage apparatus generally provides a logical volume to a host device. The host device, by transmitting an access requirement (a write requirement or a read requirement) specifying a logical volume, can write and read data to and from the logical volume.

In the Patent Literature 1, the computer described below is disclosed. That is, a logical volume (hereinafter referred to as an internal volume) is created in accordance with the disks in the computer, and the internal volume is provided to an application program. The data written from the application program to the internal volume is transferred to a storage apparatus outside the computer.

CITATION LIST

Patent Literature
[PTL 1] Japanese Unexamined Patent Application Publication No. 2008-305288

SUMMARY OF INVENTION

Technical Problem

In the Patent Literature 1, access from the application program to the internal volume is monitored by executing a management program. The application program is executed by a CPU which the host device comprises, and the management program is also executed by the CPU in the computer. Therefore, access monitoring performed by the CPU executing the management program in the computer causes the performance deterioration of the computer.

This type of problem might exist, as well as about the computer, about other types of storage controllers comprising storage devices used as caches of external storage apparatus.

Therefore, the purpose of this invention is to reduce the performance deterioration of a storage controller comprising a storage device used as a cache of an external storage apparatus.

Solution to Problem

A storage controller comprises a storage apparatus used as a cache of an external storage (a cache storage) and a control processor which is a processor coupled to the cache storage. The control processor comprises an internal access function by executing a first program (the function of accessing the cache storage) and an external access function by executing a second program (the function of accessing the external storage). The cache storage comprises a physical storage device and a processor coupled to the physical storage device (a cache processor). The internal access function transmits a read command to the cache storage. The cache processor performs a cache hit/miss determination which is the determination of whether the read target data complying with the read command is stored in the physical storage device or not. If the result of the cache hit/miss determination is negative, the cache processor transmits a read request for the external storage to the external access function, by which the external access function is executed. However, if the result of the cache hit/miss determination is positive, as the cache processor does not transmit a request to the external access function and transmits the read target data in the physical storage device to the internal access function, the external access function is not executed.

Various types of combinations of the external storage and the storage controller can be considered. For example, it may be permitted that the external storage is a storage apparatus comprising multiple physical storage devices (e.g., a disk array device) and that the storage controller is a host device accessing the external storage (e.g., a server device, a copy source storage apparatus whose remote copy destination is the external storage, or an intelligent switch device (e.g., Fibre Channel switch)). Meanwhile, it may also be permitted that the external storage is an external transportable storage apparatus while the storage controller is a computer such as a personal computer. Furthermore, it may also be permitted that the external storage apparatus is multiple physical storage devices and that the storage controller is a controller which controls access to those devices (that is, it may also be permitted that the external storage apparatus and the storage controller configure the storage apparatus accessed by the host device).

Advantageous Effects of Invention

According to this invention, it is not necessary for the external access function executed by a processor which the host device comprises to monitor any read requirements from the interface access function. Therefore, the performance deterioration of the storage controller can be reduced.

DESCRIPTION OF EMBODIMENTS

With reference to an example in which the external storage apparatus is a large-capacity storage device (e.g., disk array device) comprising multiple physical storage devices and, at the same time, the storage controller is a host device accessing the disk array device, some embodiments of this invention are described below.

Note that, in the subsequent description, though the processing is described using "program" as the subject, as a program, through being executed by a processor (e.g., a CPU (Central Processing Unit)), performs a specified processing while using storage resources (e.g., memory) and/or communication interface devices (e.g., communication ports) appropriately, the subject of the processing may also be permitted to be the processor. The processor may also be permitted to comprise dedicated hardware as well as the CPU. A computer program may also be permitted to be installed in each computer from a program source. The program source, for example, may also be permitted to be a program distributing server or storage media.

The Embodiment 1 of this invention is described below with reference to FIGS. from 1 to 17.

Embodiment 1

Firstly, the system configuration is described with reference to FIGS. 1 to 3. Next, with reference to FIGS. 4 to 10, the accesses processing of the cache SSD 200 is described. Then, with reference to FIGS. 11 to 13, the accesses processing of the storage control program VM is described. Next, with reference to FIG. 14, the initial setting is described. Finally, with reference to FIGS. 15 to 17, the start-up and termination processing is described.

Figure 1:
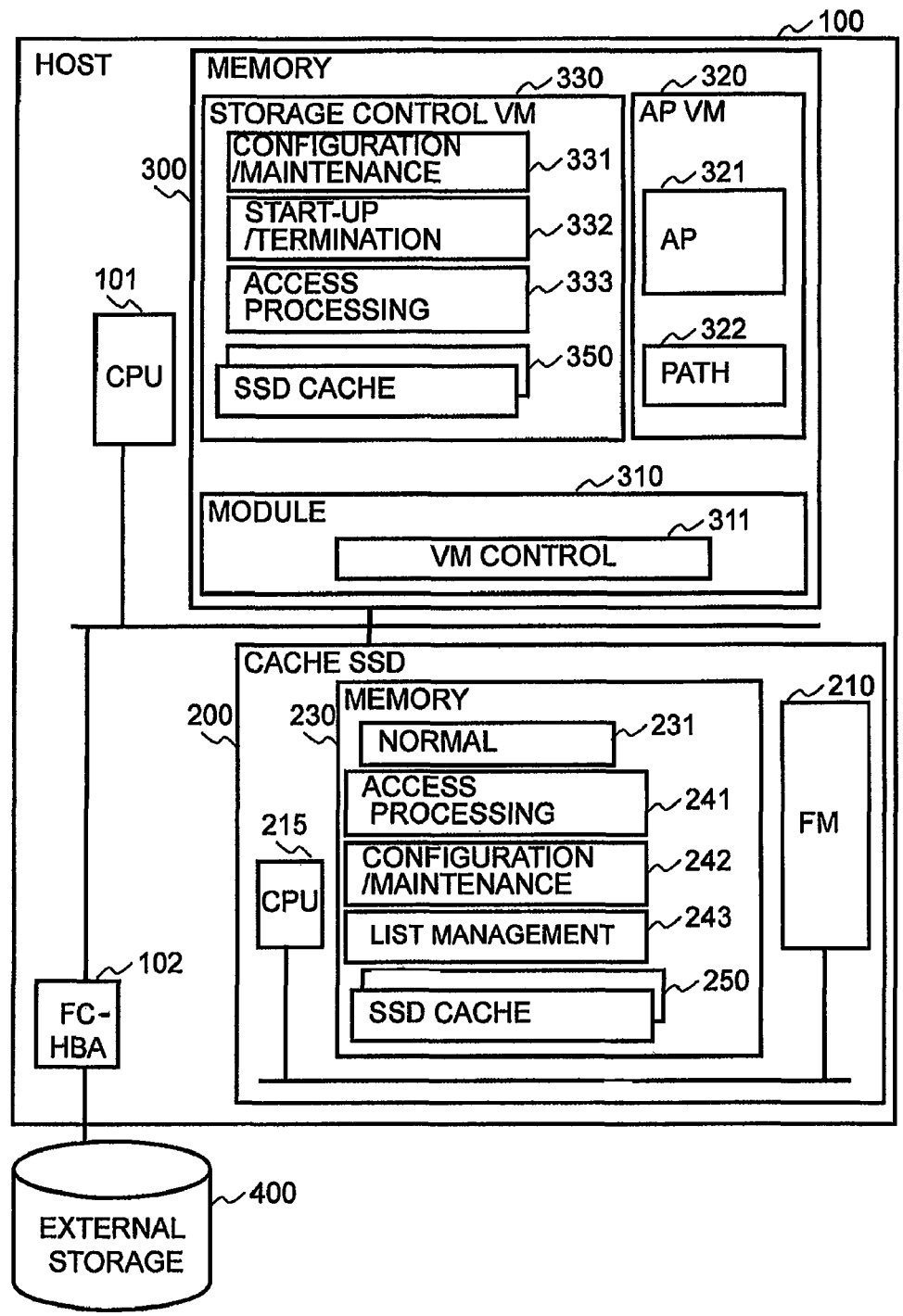
FIG. 1 shows the entire configuration of the computer system related to the Embodiment 1.

FIG. 1 shows the entire configuration of the computer system related to the Embodiment 1.

The computer system comprises an external storage apparatus (hereinafter referred to as an external storage) 400 and a host device (hereinafter referred to as a host) 100 coupled to the external storage 400.

The external storage 400 manages one or more logical volumes. A logical volume managed by the external storage 400 is hereinafter referred to as an "external VOL."

The host 100 is a device performing data processing (e.g., business processing) by executing application programs 321 described later such as the database management system. The host 100 comprises, for example, a memory 300, a cache SSD (Solid State Drive) 200, and an FC-HBA (Fibre Channel-Host Bus Adapter) 102.

The FC-HBA 102 is a communication interface device for performing the communication complying with Fibre Channel protocols. The external storage 400 is coupled to the FC-HBA 102. Instead of the FC-HBA 102, other types of communication interface devices may also be permitted to be adopted.

The cache SSD 200 is an SSD used as a cache. As more specifically described, data required for a data processing is stored in the external storage 400, and part of the data to which high-speed access is desired is also stored in the cache SSD 200. As more specifically described, a logical volume based on the cache SSD 200 is prepared and, in that logical volume, the access target data is stored. A logical volume based on the cache SSD 200 is hereinafter referred to as an "internal VOL." The internal VOL is a cache area and is made to correspond to an external VOL. Therefore, the data stored in the internal VOL is written to the external VOL appropriately via the FC-HBA 102 while the data read from the external VOL is written to the internal VOL which is made to correspond to the external VOL. In this embodiment, the capacity of an internal VOL and the capacity of an external VOL corresponding to the internal VOL are equal. Note that one internal VOL may be permitted to correspond to multiple external VOLs and that multiple internal VOLs may also be permitted to correspond to an external VOL. Furthermore, the cache SSD 200 may also be permitted to exist outside the host 100 instead of being embedded. In that case, for example, the cache SSD 200 may also be permitted to be installed for achieving communication in a faster communication method than the communication between the host 100 and the external storage 400 (for example, the connection between the host 100 and the external storage 400 is Fibre Channel while the connection between a CPU 101 and the external cache SSD 200 is PCI-Express). Furthermore, as a physical storage device comprising a cache function, instead of or in addition to the SSD, the types of physical storage devices capable of faster communication than the communication with the external storage 400 may also be permitted to be adopted.

The cache SSD 200, for example, instead of or in addition to the functions which a normal SSD comprises, comprises a cache function complying with this embodiment. The cache SSD 200, for example, comprises a memory 230, a flash memory (hereinafter referred to as an FM) 210, and a CPU 215 coupled to the same. The functions which the cache SSD 200 comprises can be classified broadly into normal functions and cache functions. The normal functions correspond to a normal control program 231. The cache functions correspond to an access processing program 241, a configuration/maintenance control program 242, a list management program 243, and SSD cache information 250.

The memory 300, for example, stores a VM (Virtual Machine) control module 310, a storage control VM 330, and an application VM 320. These are executed by the CPU 101.

The storage control VM 330 and the application VM 320 are virtual machine images, and the VM control module 310 is a module managing the virtual machines (e.g., a hypervisor). By a VM control program 311 in the module 310 being executed, the VMs 330 and 320 can execute the programs embedded in the respective virtual machine images in parallel as if independent computers execute the same. Note that, in the description below, the respective virtual machine images are described as independent computers. If the CPU 101 reads the application VM 320 and executes the VM control program 311, the CPU 101 can execute an application program (e.g., the database management system) 321. If the CPU 101 reads the storage control VM 330 and executes the VM control program 311, the CPU 101 can execute an access processing program 333 and execute the data transfer between the internal VOL and the external VOL. Note that the storage control VM 330 may also be permitted to be stored in a normal area of the cache SSD 200 (a storage area used for another purpose than the cache) and, at the time of start-up, developed for the memory 300 from the normal area. The internal VOL is based on the cache area of the normal area and the cache area.

The number of application VMs 320 is one or more. Application VMs 320 comprise application programs 321 and path control programs 322.

An application program 321 performs a specified operation.

A path control program 322 transmits a device query for recognizing the internal VOL and gives an identifier for the application program 321 to access the detected internal VOL.

The storage control VM 330 manages one or more application VMs 320. The storage control VM 330 comprises a configuration/maintenance control program 331, a start-up/termination control program 332 and the access processing program 333, and manages SSD cache information 350.

The configuration/maintenance control program 331 performs the configuration change or the maintenance processing for the storage control VM 330.

The start-up/termination control program 332 performs the processing required at the time of start-up and termination of the storage control VM 330.

The access processing program 333 reads the data which does not exist in an internal VOL from the external VOL corresponding to the internal VOL or writes the data written to the internal VOL by the application program 321 to the external VOL corresponding to the internal VOL.

The SSD cache information 350 comprises the information required for controlling access to the internal VOL. The number of pieces of SSD cache information 350 is the product of the number of pieces of SSD cache information 250 and the number of cache SSDs 200. The number of pieces of SSD cache information 250 and/or the number of cache SSDs 200 may also be permitted to be 2 or more. For example, per host 100, multiple cache SSDs 200 may also be permitted to exist, and multiple internal VOLs may also be permitted to exist.

The cache SSD 200, as mentioned above, comprises a CPU 215, a memory 230, and an FM 210.

The FM 210 is configured of multiple physical blocks. The correspondence relation between the multiple logical blocks configuring the internal VOL and the multiple physical blocks configuring the FM 210 is managed in the cache SSD 200. The correspondence relation between the logical blocks and the physical blocks is dynamically changed. The logical blocks may be permitted to be allocated to one physical block or may also be permitted to be allocated to multiple physical blocks. The capacity of the logical blocks may be permitted to be equal to the capacity of a physical block or may also be permitted to be equal to the total capacity of the multiple physical blocks.

The memory 230 stores the normal control program 231, the access processing program 241, the configuration/maintenance control program 242, the list management program 243, and the SSD cache information 250. These programs 231, 241, 242, and 243 are executed by the CPU 215.

The normal control program 231 provides part of the FM 210 to the application program 321 as a normal area (a normal SSD), and manages the information required for providing the normal area. Therefore, the FM 210 comprises, as well as the internal VOL used as a cache area, a storage area used as a normal SSD.

The access processing program 241 performs the access processing for the internal VOL.

The configuration/maintenance control program 242 performs the processing required for the initial setting, maintenance control, start-up, and termination related to the cache SSD 200.

The list management program 243 provides the information which the required SSD cache information 250 comprises.

The SSD cache information 250 comprises the information required for controlling the internal VOL. If multiple internal VOLs are prepared in accordance with one cache SSD 200, a piece of SSD cache information 250 exists per internal VOL.

Figure 2:
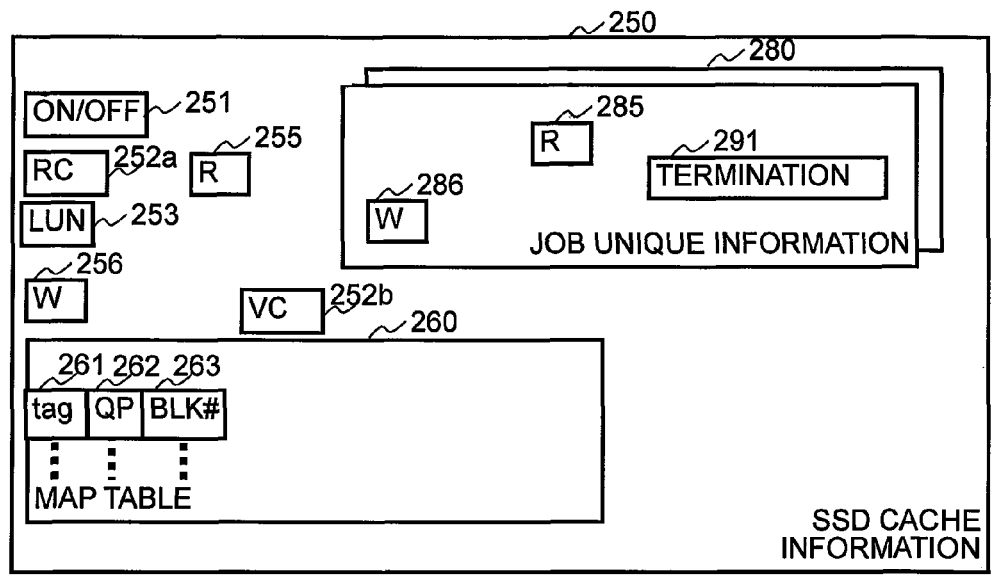
FIG. 2 shows SSD cache information 250 related to the Embodiment 1.

FIG. 2 shows the SSD cache information 250.

The SSD cache information 250 shows the relation between the internal VOL and the external VOL. Hereinafter, the internal VOL corresponding to the information 250 in this figure is referred to as the "target internal VOL" in the description of FIG. 2. Furthermore, in the description of FIG. 2, in the entire FM 210, a group of physical blocks (one or more physical blocks) allocatable to the target internal VOL is referred to as the "target physical area." Furthermore, in the description of FIG. 2, the external VOL corresponding to the target internal VOL is referred to as the "target external VOL."

The SSD cache information 250 comprises an ON/OFF flag 251, an actual capacity 252*a*, an LUN 253, a virtual capacity 252*b*, a read source identifier 255, a write destination identifier 256, a map table 260, and job unique information 280.

The ON/OFF flag 251 is the flag for controlling whether to show the target internal VOL to the application VM 320 or not. If the flag 251 indicates ON, the target internal VOL is visible to the application VM 320, and, if the flag 251 indicates OFF, the target internal VOL is not visible to the application VM 320.

The actual capacity 252*a* is the information showing the storage capacity of the target physical area. The storage capacity of the target physical storage area, though fixed in this embodiment, may also be permitted to be dynamically changed in accordance with the allocation of the physical blocks to the target internal VOL.

The LUN 253 is the LUN (Logical Unit Number) of the target internal VOL. The LUN of the target internal VOL could be specified by the access command from the application VM 320. Note that, instead of the LUN, other types of information may also be permitted to be adopted as the identification information of the target internal VOL.

The virtual capacity 252*b* is the information showing the storage capacity of the target internal VOL, that is, the storage capacity recognized by the application VM 320. In response to the capacity query from the application VM 320, the virtual capacity 252*b* is returned to the application VM 320. The capacity shown by the actual capacity 252*a* and the capacity shown by the virtual capacity 252*b* may be equal or may also be permitted to be different. Furthermore, the virtual capacity 252*b* may be permitted to be equal to or larger than the storage capacity of the target external VOL.

The read source identifier 255 is the identifier of the read source external VOL.

The write destination identifier 256 is the identifier of the write destination external VOL. In this embodiment, the external VOL corresponding to the target internal VOL (hereinafter referred to as the target external VOL) is both the read source external VOL and the write destination external VOL. However, the read source external VOL and the write destination external VOL may also be permitted to be different.

The map table 260 is the table showing the correspondence relation between the multiple logical addresses corresponding to the target internal VOL and the multiple physical addresses corresponding to the target physical area. As more specifically described, for example, the map table 260 comprises multiple entries. Each entry comprises a tag 261, a queue pointer 262, and a block number 263. The tag 261 comprises the value related to one logical address (e.g., the hash value of the logical address or part of the logical address) among the multiple logical addresses (e.g., LBAs (Logical Block Addresses)) corresponding to the target internal VOL. The tag 261 may also be permitted to be the logical address itself. The queue pointer 262 is the information for managing the release of entries. The block number 263 is the number showing one physical block among the multiple physical blocks configuring the target physical area. Therefore, in this table 260, by the correspondence between the tag 261 and the block number 263, the correspondence between the logical addresses related to the target internal VOL and the physical addresses related to the target physical area is managed. Note that it may also be permitted to store multiple block numbers 263 in the entry for being able to extend the capacity of a logical block to the capacity of the multiple physical blocks, and that it may also be permitted to store the logical address of the external VOL in the entry for making the virtual capacity 252*b* larger than the storage capacity of the target external VOL, that is, for making the correspondence between the logical addresses of the internal VOL and the logical addresses of the external VOL arbitrary. The correspondence relation between the logical addresses and the physical addresses may also be permitted to be managed by other types of information than the table (e.g., queues).

In this embodiment, the access processing program 241 is executed by the multiple execution in units of "jobs," and the job unique information 280 is the information required for processing the jobs. A piece of job unique information 280 exists per job. The job unique information 280, for example, comprises a read source identifier 285 which is the identifier of the read source external VOL (target external VOL), a write destination identifier 286 which is the identifier of the write destination external VOL (target external VOL), and a termination status information 291 showing the termination status of the job (e.g., normal termination or abnormal termination). The read source identifier 285 is, for example, a copy of the identifier 255, and the identifier 286 is, for example, a copy of the identifier 256.

Figure 3:
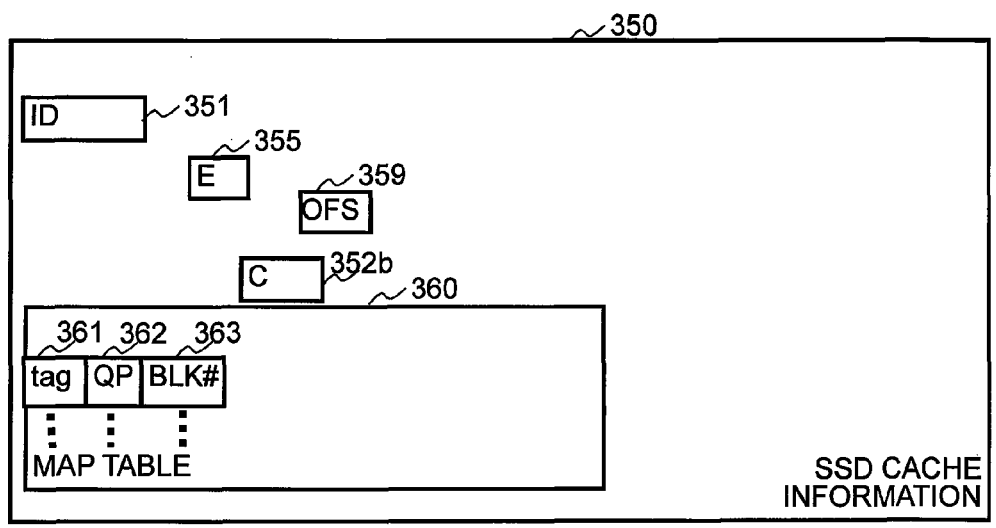
FIG. 3 shows SSD cache information 350 related to the Embodiment 1.

FIG. 3 shows the SSD cache information 350.

The SSD cache information 350 and the SSD cache information 250 correspond one to one to each other. The SSD cache information 350 shows the relation between the internal VOL and the external VOL. Hereinafter, the internal VOL corresponding to the information 350 in this figure is referred to as the "target internal VOL" in the description of FIG. 3. Meanwhile, the external VOL corresponding to the target internal VOL is referred to as the "target external VOL" in the description of FIG. 3.

The SSD cache information 350 comprises a cache identifier 351, an external VOL identifier 355, a capacity 352*b*, the offset 359, and a map table 360.

The cache identifier 351 is the identifier for the application VM 320 to recognize the target internal VOL (the identifier of the target internal VOL).

The external VOL identifier 355 is the identifier of the target external VOL (e.g., the information including the WWN (World Wide Name), the LUN and the port number).

The capacity 352*b* is the information showing the storage capacity of the target external VOL.

The offset 359 is the information showing the difference between the logical address of the target internal VOL (e.g., the LBA) and the logical address of the target external VOL. In this embodiment, the difference is zero. This is because, in this embodiment, the storage capacity of the internal VOL and the storage capacity of the external VOL are equal.

The map table 360 is a copy of the map table 360 in the SSD cache information 250 corresponding to this information 350.

The processing performed in this embodiment is described below. Note that, in the description below related to the access processing, for the prevention of confusion, a requirement from the application VM 320 to the cache SSD 200 is referred to as a "command", a requirement from the cache SSD 200 to the storage control VM 330 is referred to as a "request", and a requirement for the host 100 to access the external VOL is referred to as a "requirement".

Figure 4:
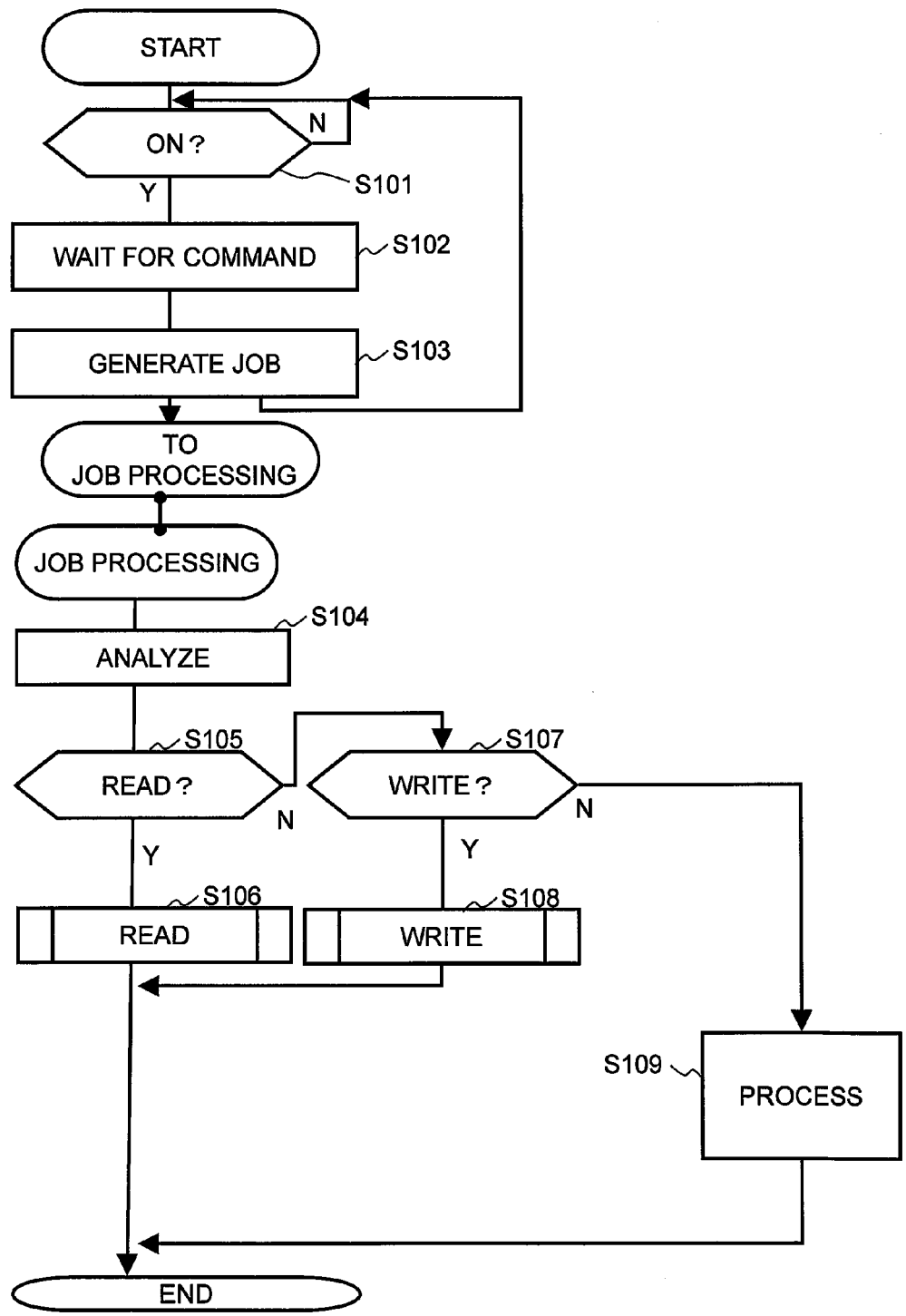
FIG. 4 is a flowchart of a processing performed by the access processing program 241 in a cache SSD 200 related to the Embodiment 1.

FIG. 4 is a flowchart of the processing performed by the access processing program 241 in the cache SSD 200.

The access processing program 241 refers to the ON/OFF flag 251 about the respective pieces of SSD cache information 250. For the SSD cache information 250 whose flag 251 is OFF, the program 241 does not continue the processing until the flag 251 changes to ON (S101: Y). That is, the program 241, if the flag 251 is OFF, even if receiving the query of the existence of devices from the application VM 320, does not respond that the internal VOL corresponding to the information 250 comprising the flag 251 exists. Therefore, the application VM 320 does not recognize the existence of the internal VOL corresponding to the information 250 comprising the flag 251.

The program 241 waits for commands from the application VM 320 (S102). If there is a command, the program 241 generates a job (S103), and transits to the job processing. In that case, the program 241 copies the read source identifier 255 and the write destination identifier 256 to the job unique information 280 corresponding to the generated job as the read source identifier 285 and the write destination identifier 286.

In the job processing, the program 241 analyzes the accepted command (S104). As more specifically described, for example, the program 241 performs the processing below.
*The program 241 identifies the command type.
*If the command type is read or write, access destination information is included in the command. The access destination information comprises the LUN showing the access destination internal VOL and the address showing the access destination area in the internal VOL (hereinafter referred to as the access destination address). If the command type is read or write, the program 241 identifies the SSD cache information 250 corresponding to the access destination internal VOL (the SSD cache information 250 including the LUN 253 showing the LUN specified by the command).

If the command type is read (S105: Y), the program 241 performs the read processing (S106).

If the command type is write (S107: Y), the program 241 performs the write processing (S108).

If the command type is neither read nor write (S107: N), the program 241 performs the processing complying with the command (S109).

Figure 5:
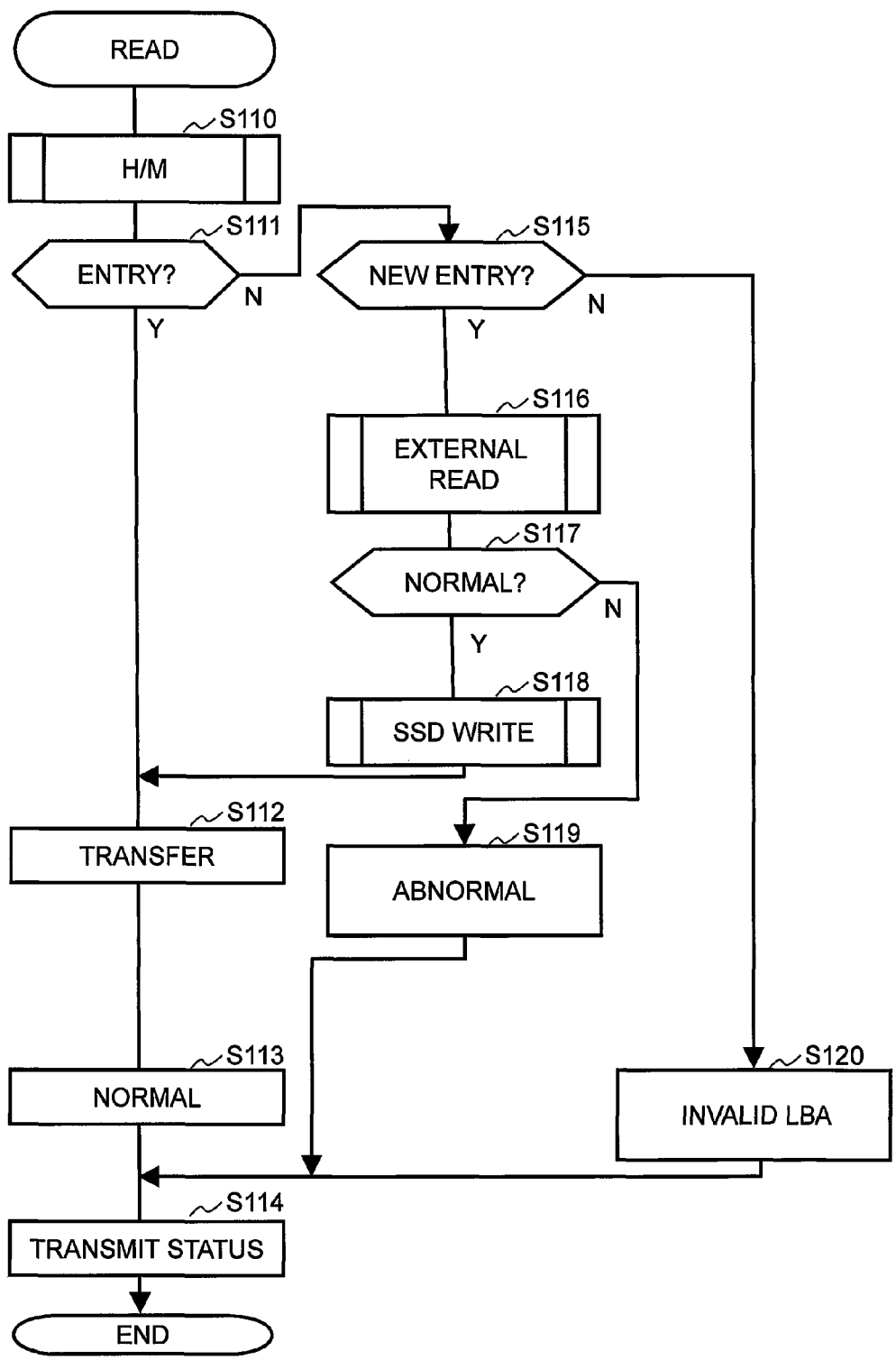
FIG. 5 is a flowchart showing a read processing (S106 in FIG. 4) in the cache SSD 200 related to the Embodiment 1.

FIG. 5 is a flowchart showing the read processing (S106 in FIG. 4) in the cache SSD 200.

The program 241, with reference to the map table 260 in the SSD cache information 250 identified at S104 in FIG. 4, performs a hit/miss determination processing (S110). As more specifically described, the hit/miss determination processing is invoked.

If, as a result of S110, the corresponding entry is found in the map table 260 (S111: Y), it can be ascertained that the read target data already exists in the FM 210. Therefore, the program 241 reads the data from the physical block identified from the block number 263 in the found entry, and transfers the read data to the access source (the application VM 320 which is the transmission source of the command) (S112). The program 241 sets the information showing normal termination as the termination status 291 for the job unique information 280 corresponding to this read processing (job) (S113). The program 241 transmits the status showing normal termination to the access source (S114).

If the result of S110 is the allocation of a new entry (S115: Y), it can be ascertained that the read target data does not exist in the FM 210. Therefore, the program 241 performs the external read request processing (S116). As more specifically described, the program 241 invokes the external read request processing. By this means, the request for issuing a read requirement to the external storage 400 (read requirement) is transmitted to the storage control VM 330.

If the return value at S116 shows normal (S117: Y), the response from the storage control VM 330 comprises the data read by the storage control VM 330 from the external storage 400 (as more specifically described, the external VOL corresponding to the access destination internal VOL). The program 241 performs SSD write (S118). As more specifically described, the program 241 writes the data to the FM 210 (access destination internal VOL). Then, the program 241 executes the above-mentioned steps from S112 to S114.

If the return value at S116 shows abnormal (S117: N), the program 241 sets the information showing abnormal termination as the termination status 291 for the job unique information 280 corresponding to this read processing (job) (S119). The program 241 transmits the status showing abnormal termination to the access source (S114).

If the result of S110 is not the allocation of a new entry either (S115: N), it can be ascertained that the access destination address identified at S104 (e.g., the LBA) is invalid. Therefore, the program 241 sets the information indicating that the access destination address is invalid as the termination status 291 for the job unique information 280 corresponding to this read processing (job) (S120). The program 241 transmits the status showing that the address is invalid to the access source (S114).

Figure 6:
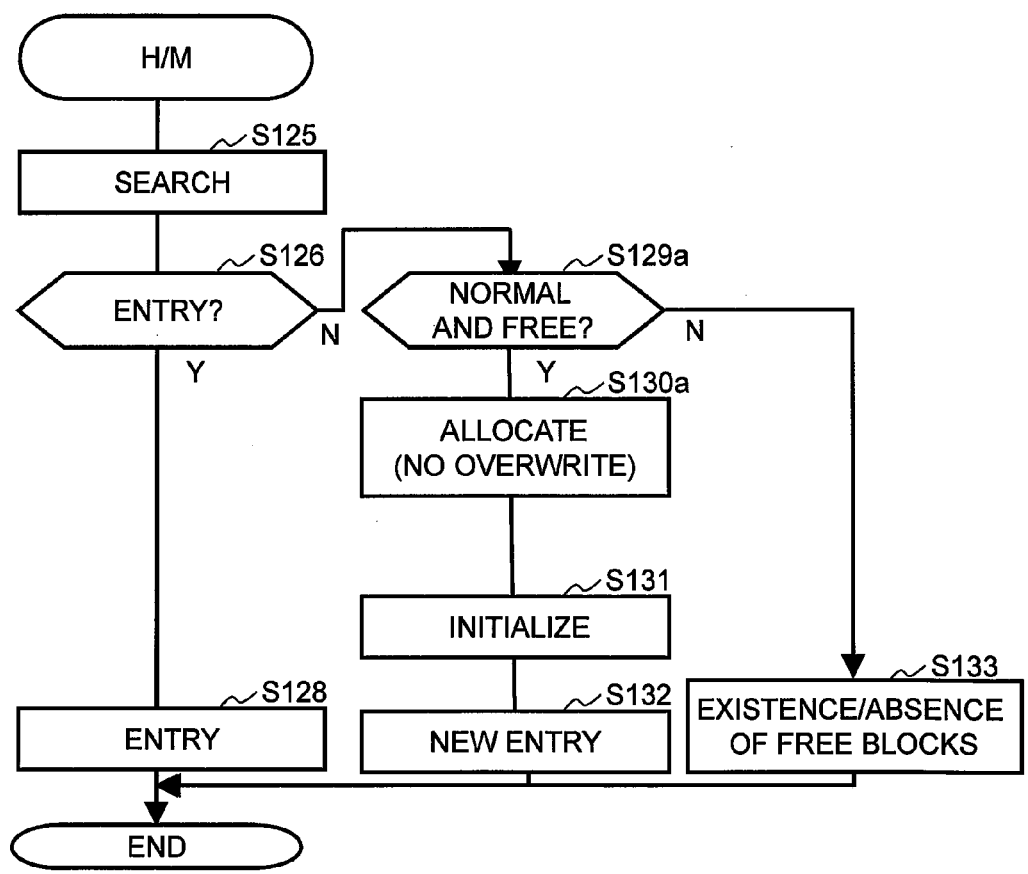
FIG. 6 is a flowchart showing the hit/miss determination processing related to the Embodiment 1.

FIG. 6 is a flowchart showing the hit/miss determination processing.

The access processing program 241 determines whether the entry corresponding to the access destination address is in the map table 260 or not (S125). As more specifically described, for example, the program 241 performs the processing below.
(Processing 1) The program 241 generates the hash value of the access destination address identified at S104 (e.g., the LBA).
(Processing 2) The program 241 identifies the entry with reference to the hash value generated at (Processing 1) as the index.
(Processing 3) The program 241 checks whether the upper part of the above-mentioned index matches the upper part of the tag 261 or not.
(Processing 4) If, the result of (Processing 3) is "unmatched," the program 241 refers to the lower link bit of the tag 261. If the link bit shows "OFF," the program 241 terminates the search. If the link bit shows "ON," the program 241 performs the above-mentioned (Processing 1). In that case, the generated hash value is the hash value of the index referred to at the preceding (Processing 3).

If the corresponding entry is found at S125 (S126: Y), the program 241 returns the value indicating that the entry exists to the invocation source of the hit/miss determination processing (S128).

If no corresponding entry is found at S125 (S126: N), the program 241 determines whether the access destination address is the address belonging to the normal range or not and, at the same time, whether there is a free physical block (physical block allocatable to the logical block of the internal VOL) in the FM 210 or not (S129a).

If the result of the determination at S129a is positive (S129a: Y), the program 241 saves a free entry from the map table 260 and allocates the free physical block to the logical block corresponding to the access destination address (S130a). The program 241 initializes the entry saved at S130a (S131). At S131, for example, for the saved entry, as the tag 261, the value related to the access destination address is set, and, as the block number 263, the physical block number allocated at S130a is set. The program 241 returns the value showing the new entry to the invocation source of the hit/miss determination processing.

If the result of the determination at S129a is negative (S129a: N), the program 241 returns the value showing the existence or absence of a free physical block to the invocation source of the hit/miss determination processing. However, in this embodiment, as the storage capacity of the internal VOL and the storage capacity of the external VOL corresponding to the internal VOL are equal, it does not happen that free blocks run out.

Figure 7:
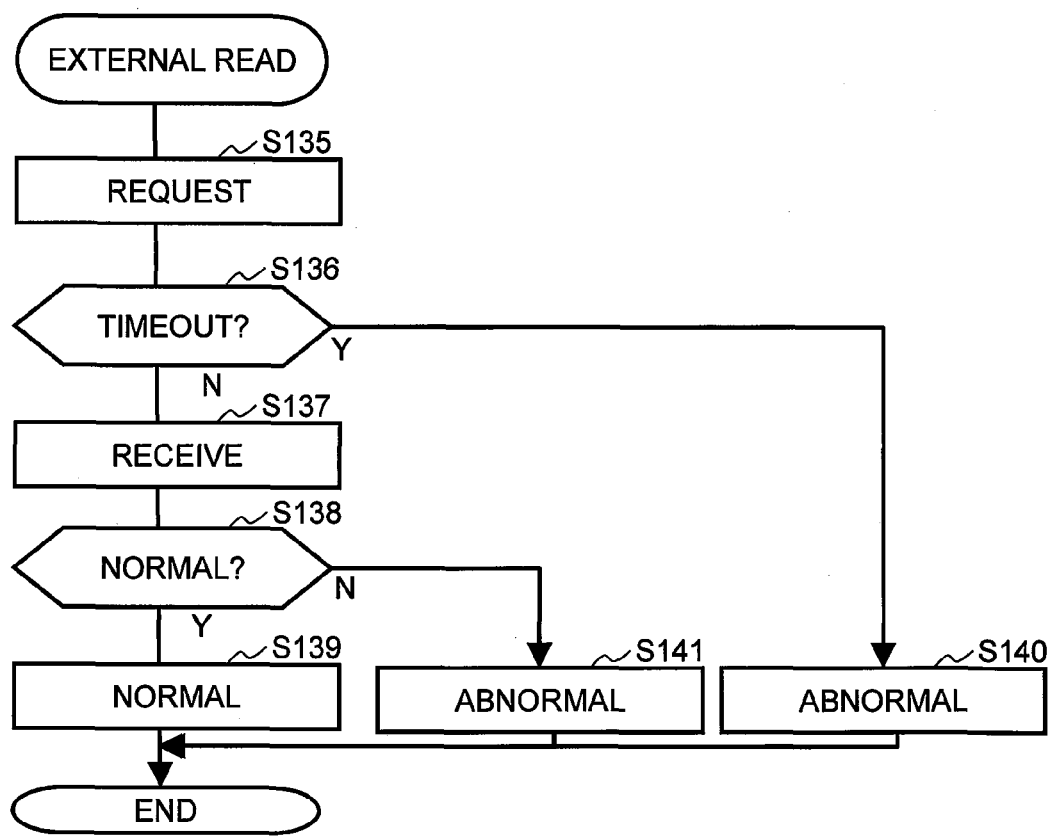
FIG. 7 is a flowchart showing the external read request processing related to the Embodiment 1.

FIG. 7 is a flowchart showing the external read request processing.

The access processing program 241 creates a read request comprising the access destination address identified at S104 and the read source identifier 255 (the identifier 255 in the SSD cache information 250 identified at S104), and transmits the read request to the storage control VM 330 (S135).

The program 241, if receiving the response from the storage control VM 330 within a specified time after the transmission of the read request (S136: N, S137), determines whether the response is normal or not (S138).

If the result of the determination at S138 is positive (S138: Y), the program 241, as the value to return to the invocation source of the external read request processing, generates a value showing normal (S139), and returns the control to the invocation source.

If the result of the determination at S138 is negative (S138: N), the program 241, as the value to return to the invocation source of the external read request processing, generates a value showing abnormal (S141), and returns the control to the invocation source.

The program 241, if not receiving the response from the storage control VM 330 within a specified time after the transmission of the read request (S136: Y), as the value to return to the invocation source of the external read request processing, generates a value showing abnormal (S140), and returns the control to the invocation source.

Figure 8:
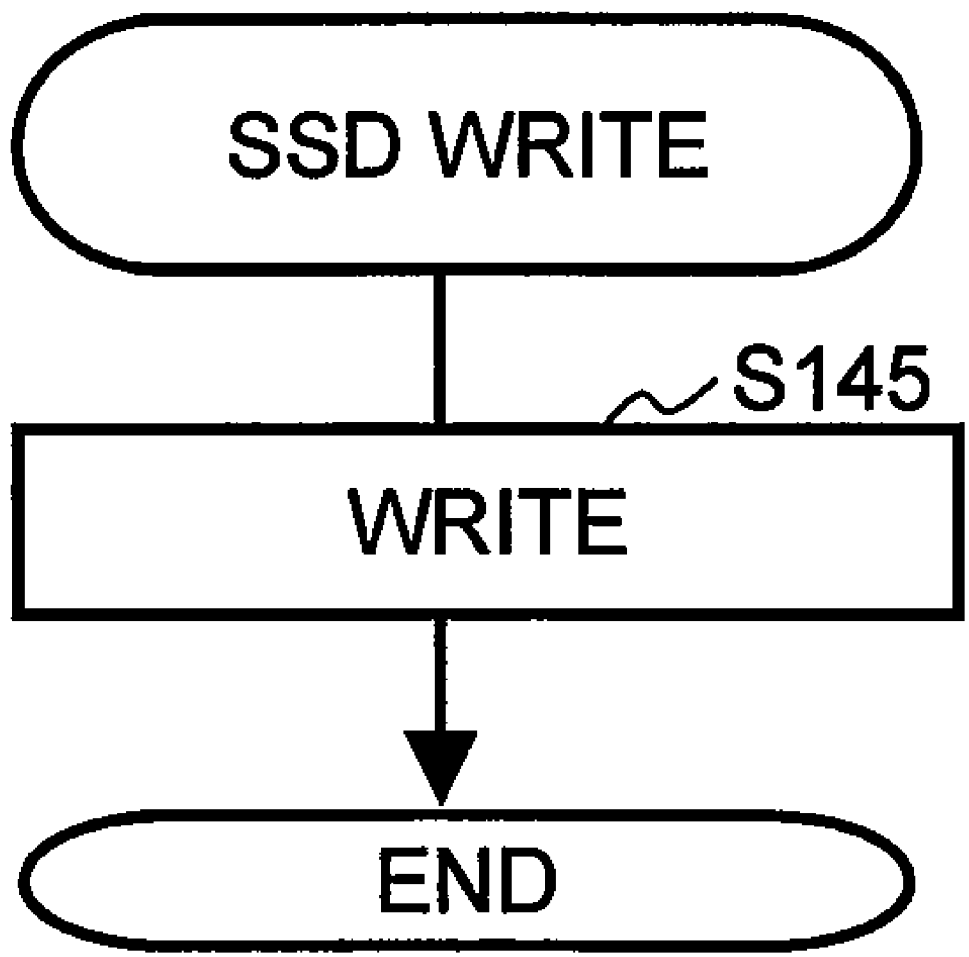
FIG. 8 is a flowchart showing SSD write related to the Embodiment 1.

FIG. 8 is a flowchart showing SSD write.

The program 241 writes the data to the physical block (the physical block in the FM 210) identified from the entry in the map table 260 (S145). After that, the processing returns to the invocation source of the SSD write.

Figure 9:
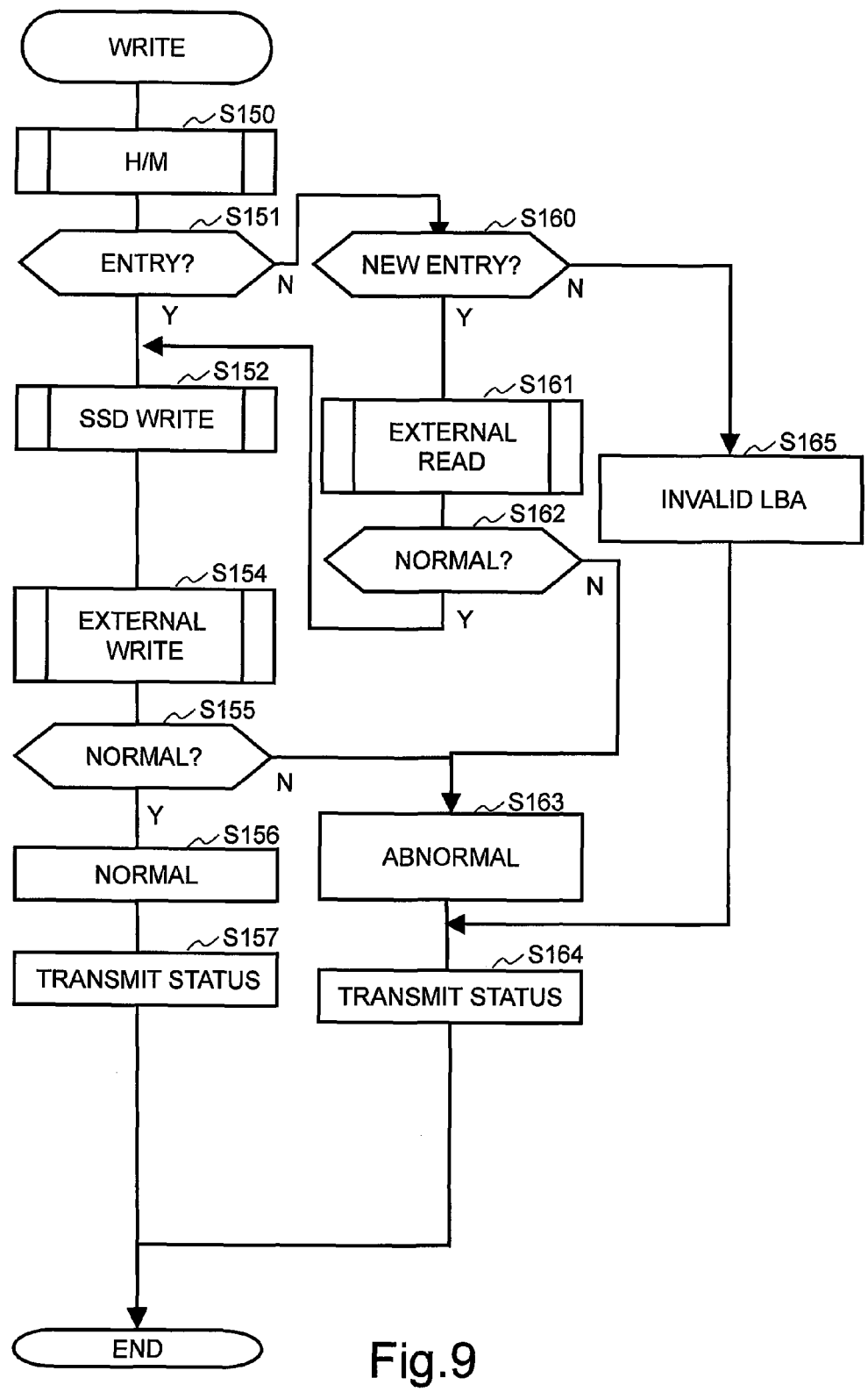
FIG. 9 is a flowchart showing the write processing (S108 in FIG. 4) in the cache SSD 200 related to the Embodiment 1.

FIG. 9 is a flowchart showing the write processing (S108 in FIG. 4) in the cache SSD 200.

The program 241, with reference to the map table 260 in the SSD cache information 250 identified at S104 in FIG. 4, performs the hit/miss determination processing (S150), that is, the processing shown in FIG. 6.

If, as a result of S150, the corresponding entry is found in the map table 260 (S151: Y), the program 241 performs SSD write (S152). By this means, the processing of FIG. 8 is performed. The write destination in this processing is the logical block in the access destination internal VOL (the logical block corresponding to the access destination address), as more specifically described, the physical block to which the logical block is allocated.

If the result of S150 is the allocation of a new entry (S160: Y), the program 241 performs the external read request processing (S161). By this means, the processing of FIG. 7 is performed. Note that, in this case, the data including the part to be rewritten by the write processing is read by the external VOL. After that, at S152, part of the (or the entire) read data is overwritten by the write target data.

If the return value at S161 shows normal (S162: Y), the program 241 continues the processing at S152 and later. If the return value at S161 shows abnormal (S162: N), the program 241 continues the processing at S163 and later which is described later.

Next, the program 241 performs the external write request processing specifying the write destination identifier 286 (the identifier 286 in the SSD cache information 250 corresponding to the access destination internal VOL) (S154).

If the return value at S154 shows normal (S155: Y), the program 241 sets the information showing normal termination as the termination status 291 for the job unique information 280 corresponding to this write processing (job) (S156). The program 241 transmits the status showing normal termination to the access source (application VM 320) (S157).

If the return value at S154 shows abnormal (S155: N), the program 241 sets the information showing abnormal termination as the termination status 291 for the job unique information 280 corresponding to this write processing (job) (S163). The program 241 transmits the status showing abnormal termination to the access source (application VM 320) (S164).

As mentioned above, in this embodiment, the program 241, after the write target data is written to both the access destination internal VOL and the external VOL corresponding to the same, returns the response (the status) to the access source.

If the result of S150 is not the allocation of a new entry either (S160: N), it can be ascertained that the access destination address identified at S104 (e.g., the LBA) is invalid. Therefore, the program 241 sets the information indicating that the access destination address is invalid (e.g., that no free block exists) as the termination status 291 for the job unique information 280 corresponding to this write processing (job) (S165). The program 241 transmits the status showing that the address is invalid to the access source (S164).

Figure 10:
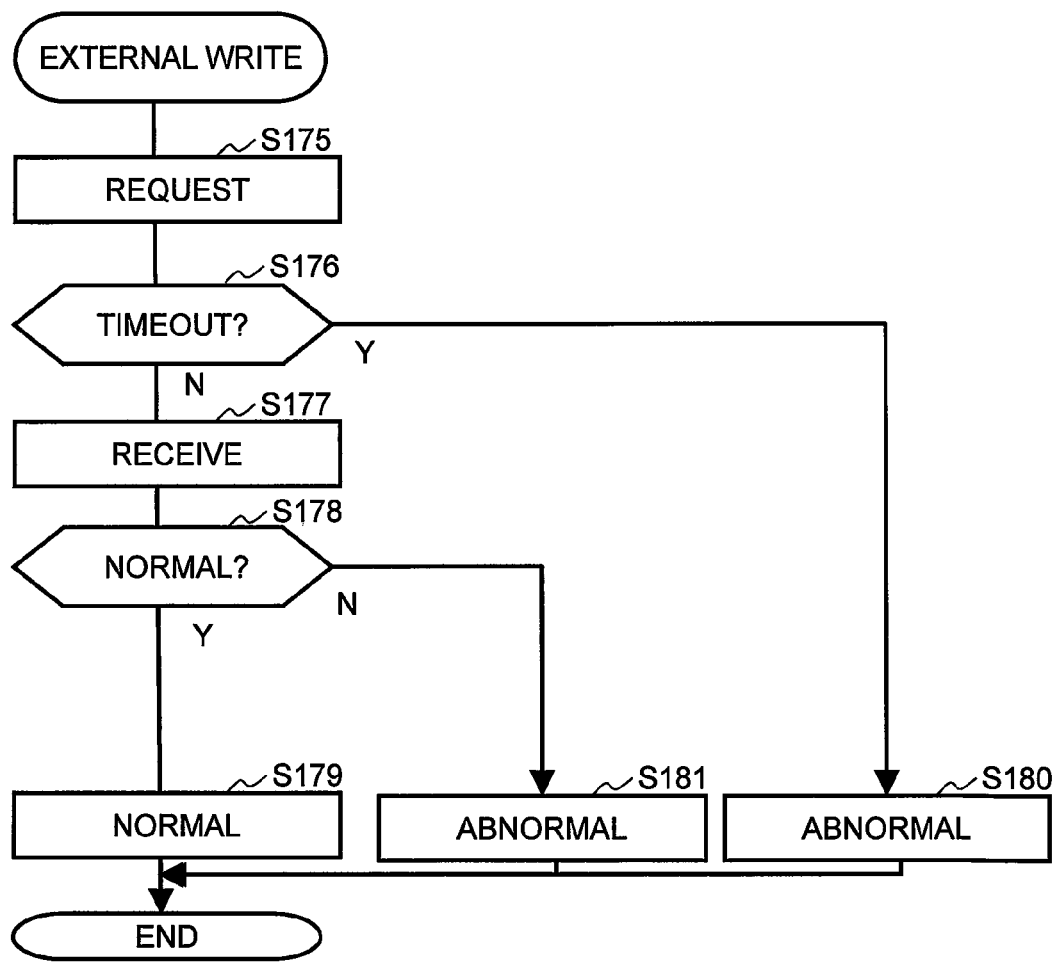
FIG. 10 is a flowchart showing the external write request processing related to the Embodiment 1.

FIG. 10 is a flowchart showing the external write request processing.

The program 241 creates a write request comprising the write destination identifier 256 (the identifier of the external VOL) and the access destination address identified at S104, and transmits the write request and the write target data to the storage control VM 330 (S175).

The program 241, if receiving the response from the storage control VM 330 within a specified time after the transmission of the write request and the write target data (S176: N, S177), determines whether the response is normal or not (S178).

If the result of the determination at S178 is positive (S178: Y), the program 241, as the value to return to the invocation source of the external write request processing, generates a value showing normal (S179), and returns the control to the invocation source.

If the result of the determination at S178 is negative (S178: N), the program 241, as the value to return to the invocation source of the external write request processing, generates a value showing abnormal (S181), and returns the control to the invocation source.

The program 241, if not receiving the response from the storage control VM 330 within a specified time after the transmission of the write request (S176: Y), as the value to return to the invocation source of the external write request processing, generates a value showing abnormal (S180), and returns the control to the invocation source.

Figure 11:
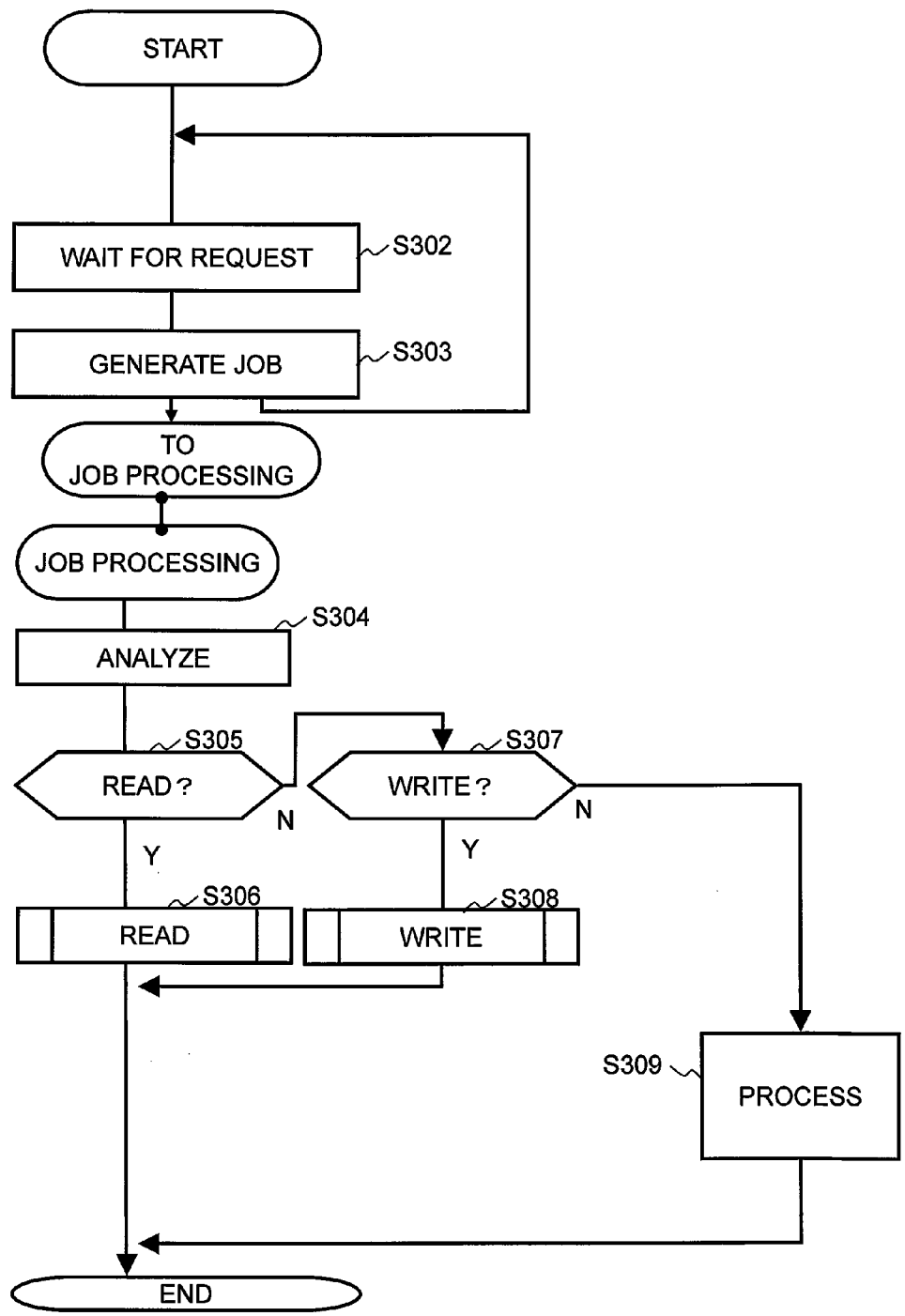
FIG. 11 is a flowchart showing the processing performed by the access processing program 333 in the storage control VM 330 related to the Embodiment 1.

FIG. 11 is a flowchart showing the processing performed by the access processing program 333 in the storage control VM 330.

The program 333 waits for a request from the cache SSD 200 (S302). The program 333, if there is a request, generates a job (S303), and returns to S302.

In the job processing, the program 333 analyzes the accepted request (S304). If the type of the accepted request is read (S305: Y), the program 333 performs the read processing (S306). If the type of the accepted request is write (S307: Y), the program 333 performs the write processing (S308). If the type of the accepted request is other than read or write (S307: N), the program 333 performs the processing complying with the request (S309).

Figure 12:
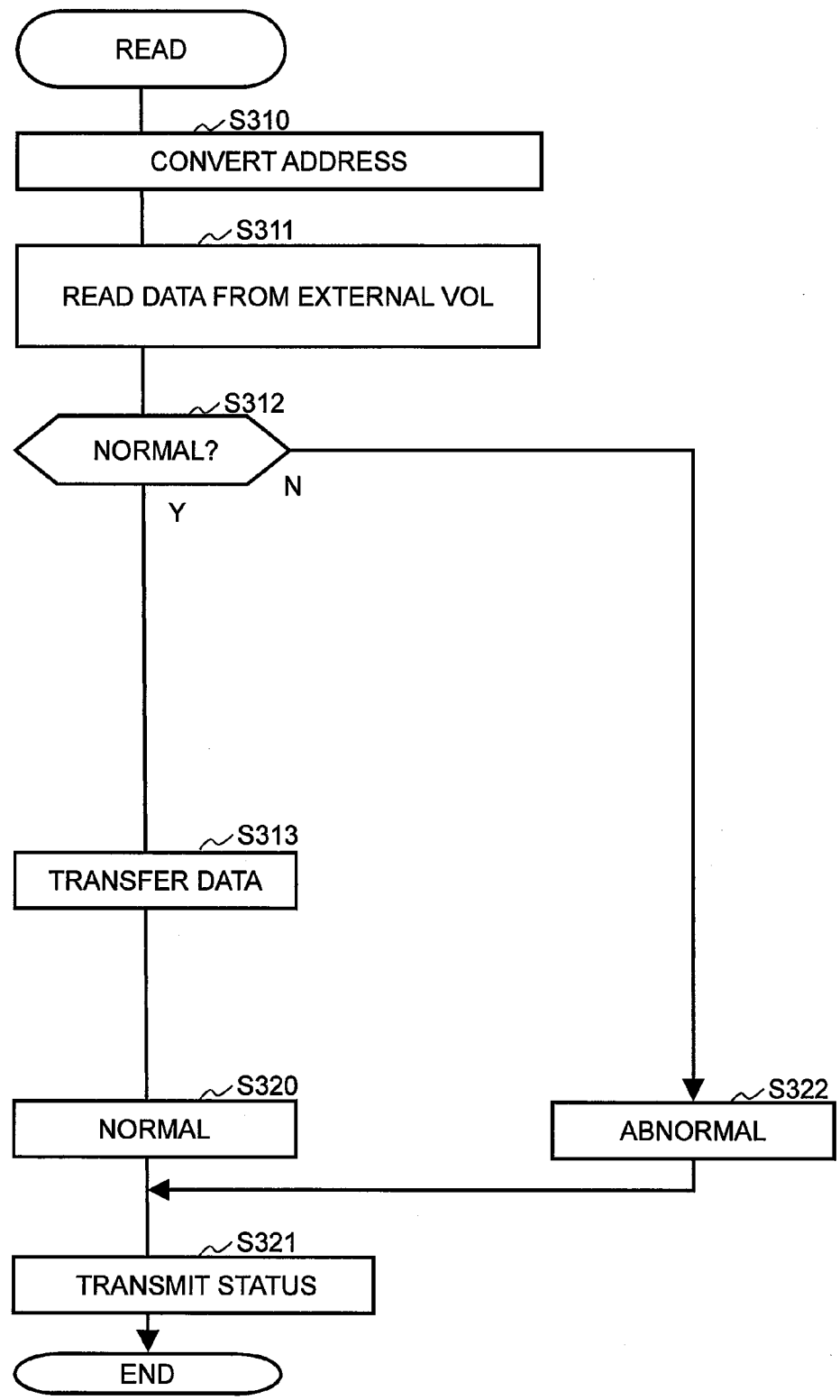
FIG. 12 is a flowchart showing the read processing performed by the storage control VM 330 (S306 in FIG. 11) related to the Embodiment 1.

FIG. 12 is a flowchart showing the read processing performed by the storage control VM 330 (S306 in FIG. 11).

The access processing program 333 performs address conversion (S310). As more specifically described, the program 333 performs the processing below.

*The program 333 identifies the offset 359 in the SSD cache information 350 including the external VOL identifier 355 identified from the read source identifier 255 which the read request received from the cache SSD 200 comprises.

*The program 333 shifts the access destination address which the read request comprises by the amount of the identified offset 359.

The program 333 transmits the read requirement comprising the converted address (the address related to the external VOL) and the above-mentioned identified external VOL identifier 355 to the external storage 400 (S311).

If the result of S311 is normal (S312: Y), that is, in response to the read requirement transmitted at S311, if the data is read from the external storage 400, the program 333 transfers the data to the transmission source of the read request (the cache SSD 200) (S313). Then, the program 333 returns the status showing normal to the transmission source of the read request (cache SSD 200) (S320, S321).

If the result of S311 is not successful (S312: N), the program 333 returns the status showing abnormal to the transmission source of the read request (cache SSD 200) (S322, S321).

Figure 13:
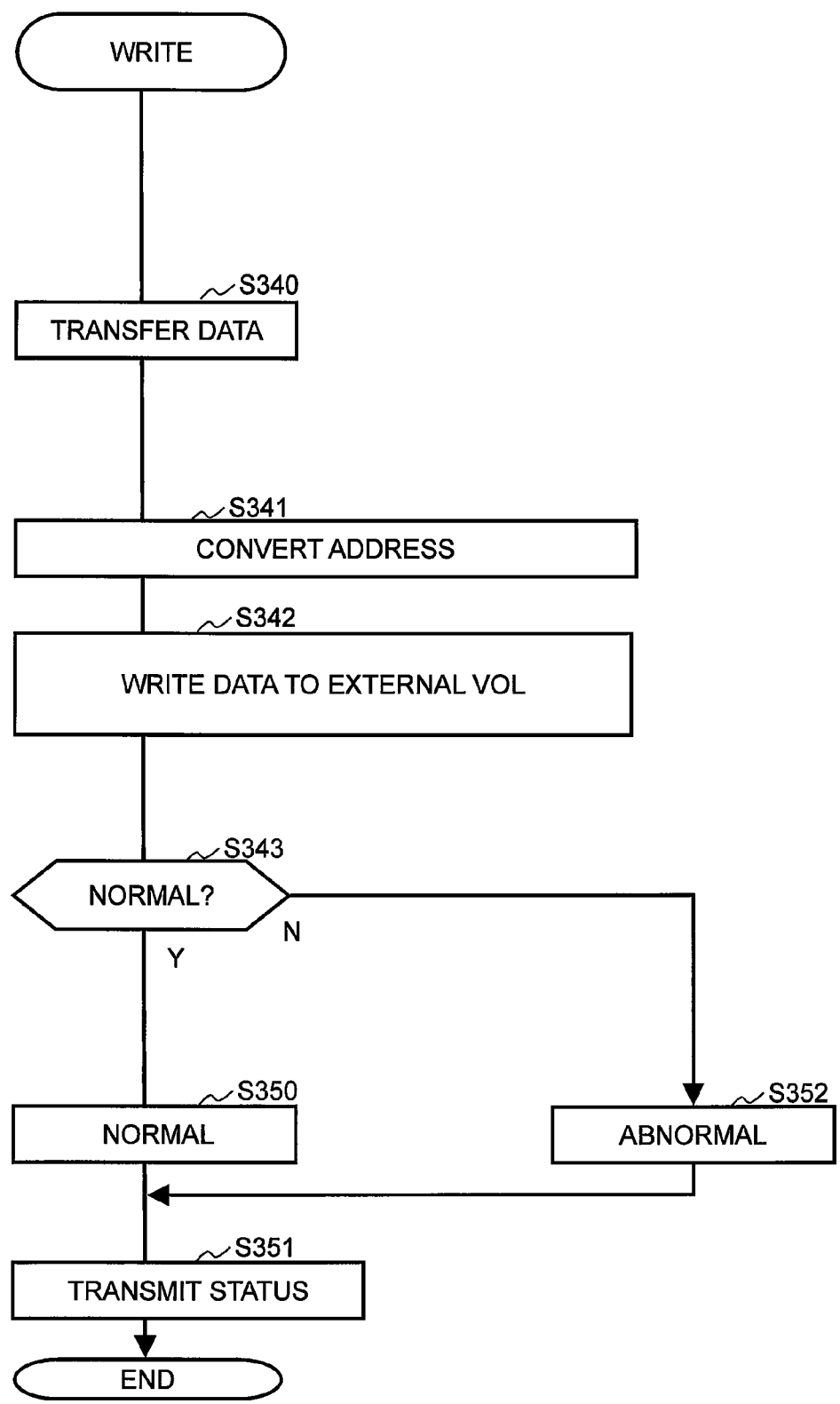
FIG. 13 is a flowchart showing the write processing performed by the storage control VM 330 (S308 in FIG. 11) related to the Embodiment 1.

FIG. 13 is a flowchart showing the write processing performed by the storage control VM 330 (S308 in FIG. 11).

The access processing program 333 receives a write request and a write target data from the cache SSD 200 (S340).

The program 333 performs address conversion (S341). As more specifically described, the program 333 performs the processing below.

*The program 333 identifies the offset 359 in the SSD cache information 350 including the external VOL identifier 355 identified from the write destination identifier 256 which the write request received from the cache SSD 200 comprises.

*The program 333 shifts the access destination address which the write request comprises by the amount of the identified offset 359.

The program 333 transmits the write requirement comprising the converted address (the address related to the external VOL) and the above-mentioned identified external VOL identifier 355 and the write target data to the external storage 400 (S342).

If the result of S342 is normal (S343: Y), that is, if a completion response from the external storage 400 is received in response to the write requirement transmitted at S342, the program 333 returns the status showing normal to the transmission source of the write request (cache SSD 200) (S350, S351).

If the result of S342 is not successful (S343: N), the program 333 returns the status showing abnormal to the transmission source of the write request (cache SSD 200) (S352, S351).

The description related to the access processing is as above. Next, the respective types of processing related to the initial setting, start-up, and termination are described. Note that, in the description of the same, unlike the description related to the access processing, the terms "command," "request," and "requirement" are not separately distinguished, and those terms are referred to as the integrated term "requirement."

Figure 14:
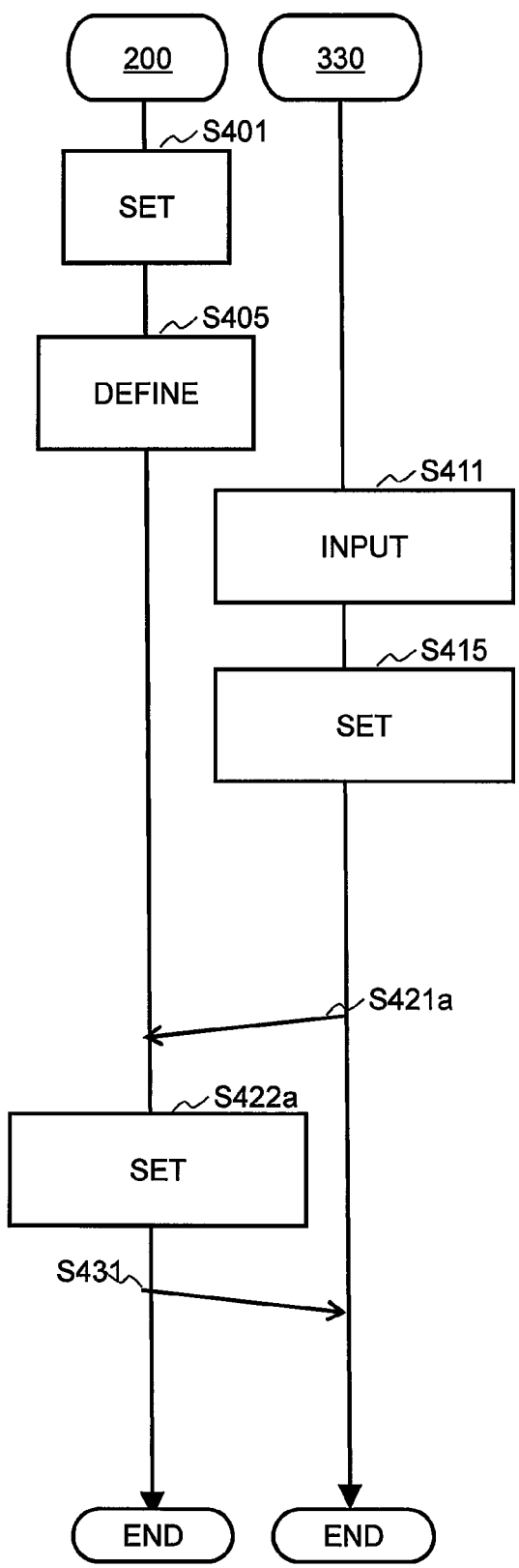
FIG. 14 is a ladder chart showing the initial setting processing related to the Embodiment 1.

FIG. 14 is a ladder chart showing the initial setting processing.

The configuration/maintenance control program 242 in the cache SSD 200 receives the information which must be set for the cache SSD 200 (hereinafter referred to as the cache definition information) from the administrator (S401). The cache definition information is the information including the information set for the host 100, for example, the information including the information showing the LUN and the actual capacity 252a of the internal VOL and the storage capacity of the normal area (the storage area used for another purpose than the cache). For example, the program 242, for the SSD cache information 250 corresponding to the internal VOL identified from the LUN which the setting information comprises (hereinafter referred to as the target internal VOL in the description of FIG. 14), sets the actual capacity 252a of the internal VOL. Furthermore, the program 242 sets the information showing the storage capacity of the normal area which the above-mentioned setting information comprises.

Next, the program 242 performs the initial setting for the cache of the cache SSD 200 (S405). As more specifically described, for example, the program 242, for the SSD cache information 250 corresponding to the target internal VOL, sets "OFF" as the ON/OFF flag 251 and, for all the entries in the map table 260, as the tag 261, the queue pointer 262, and the block number 263, writes invalid values.

Meanwhile, the configuration/maintenance control program 331 in the storage control VM 330 receives the information for access from the storage control VM 330 to the external VOL (hereinafter referred to as the external VOL definition information) from the administrator (S411). The external VOL definition information, for example, comprises the information 351, 355, 359, and 352b set for the SSD cache information 350. The program 331, using the external VOL definition information, for the SSD cache information 350 corresponding to the target internal VOL (address 0 to 999), sets various types of information (S415). For example, for making the first ½ of the external VOL correspond to the first internal VOL and for making the latter ½ of the external VOL correspond to the second internal VOL respectively, "0" must be set as the offset 359 for the first internal VOL and "499" must be set as the offset 359 for the second internal VOL.

After that, the program 331 transmits the setting information to the cache SSD 200 (S421a). The setting information, for example, includes the write destination identifier 256, the read source identifier 255, and the virtual capacity 252b. The identifiers 256 and 255 are the external VOL identifiers 355 or the identifiers uniquely corresponding to the same (the identifiers in the storage control VM 330). The virtual capacity 252b is the value ascertained with reference to the capacity 352b and the offset 359. The transmission destination of the setting information is the cache SSD 200 which is the base of the target internal VOL.

In the cache SSD 200, the program 242 sets the received write destination identifier 256, the read source identifier 255, and the virtual capacity 252b for the SSD cache information 250 corresponding to the target internal VOL (S422a), and returns the response (S431).

The program 331 in the storage control VM 330 receives the response from the cache SSD 200, and the initial setting is completed.

Figure 15:
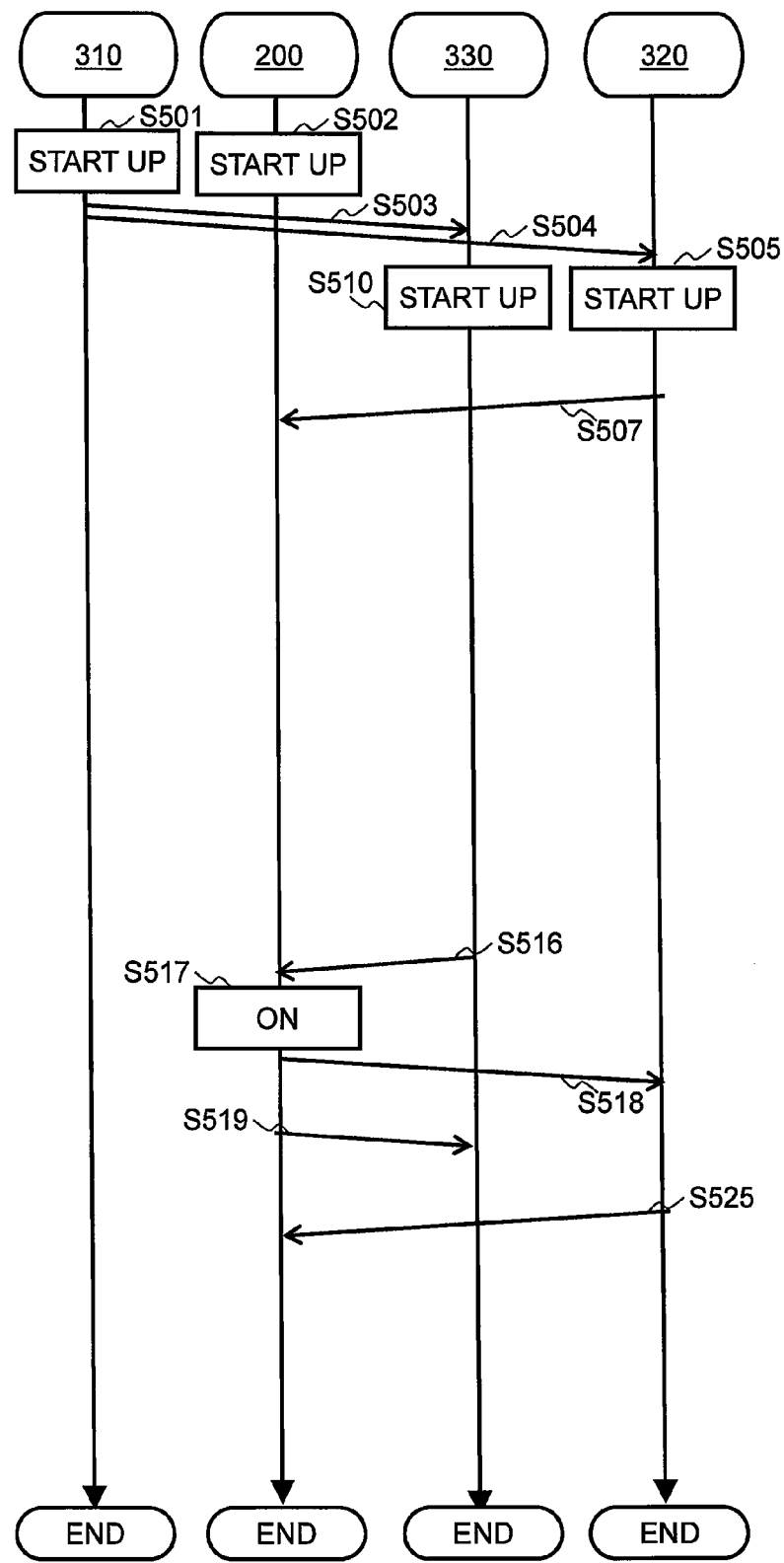
FIG. 15 is a ladder chart showing the start-up processing at the host 100 related to the Embodiment 1.

FIG. 15 is a ladder chart showing the start-up processing at the host 100.

Firstly, the CPU 101 starts up the VM control module 310 (S501). Meanwhile, the cache SSD 200 is also started up with the power-on (S502). Furthermore, the CPU 101 transmits a start-up requirement to each of the storage control VM 330 and the application VM 320 (S503, S04). If the storage control VM 330 is stored in the normal area of the cache SSD 200, at this point of time, the CPU 101 reads the VM 330 from the cache SSD 200, extends the same to the memory 300, and transmits the start-up requirement to the VM 330. Next, the CPU 101 starts up the start-up/termination program 332 in the storage control VM 330 (S510) and, at the same time, starts up the path control program 322 in the application VM 320 (S505).

Furthermore, the path control program 322 transmits a device query (a query whether an internal VOL exists or not) to the cache SSD 200 (S507). However, at this point, as the ON/OFF flags 251 in all the pieces of SSD cache information 250 are OFF, to the device query, no response showing the existence of an internal VOL is returned. After this, the path control program 322 regularly (or irregularly) repeats S507.

Meanwhile, the start-up/termination control program 332 transmits a validation requirement which requires making an internal VOL valid to the cache SSD 200 (S516).

The configuration/maintenance control program 242 in the cache SSD 200 receives a validation requirement for the internal VOL and, in response to the requirement, sets the ON/OFF flags 251 in all the pieces of SSD cache information 250 to ON (S517). That is, according to this start-up processing, unless the storage control VM 330 is started up, the existence of an internal VOL is not disclosed to the application VM 320, and, after the storage control VM 330 is started up, the existence of an internal VOL is disclosed to the application VM 320. This prevents the application VM 320 from referring to the internal VOL whose corresponding external VOL cannot be accessed as the storage control VM 330 is not started up or for other reasons. Note that the validation requirement may be permitted to be performed for all the internal VOLs or may also be permitted to be performed for part of the internal VOLs appropriately.

After this, as access to the internal VOL becomes possible, the access processing program 241 responds to device queries from the application VM 320 (S518). Furthermore, the program 241 returns the response indicating that an internal VOL exists (hereinafter referred to as the response of existence) to the storage control VM 330 (S519).

The application VM 320, by receiving the response of existence, ascertains that access to the internal VOL is possible, and mounts the internal VOL (i.e., recognizes the internal VOL) (S525).

Figure 16:
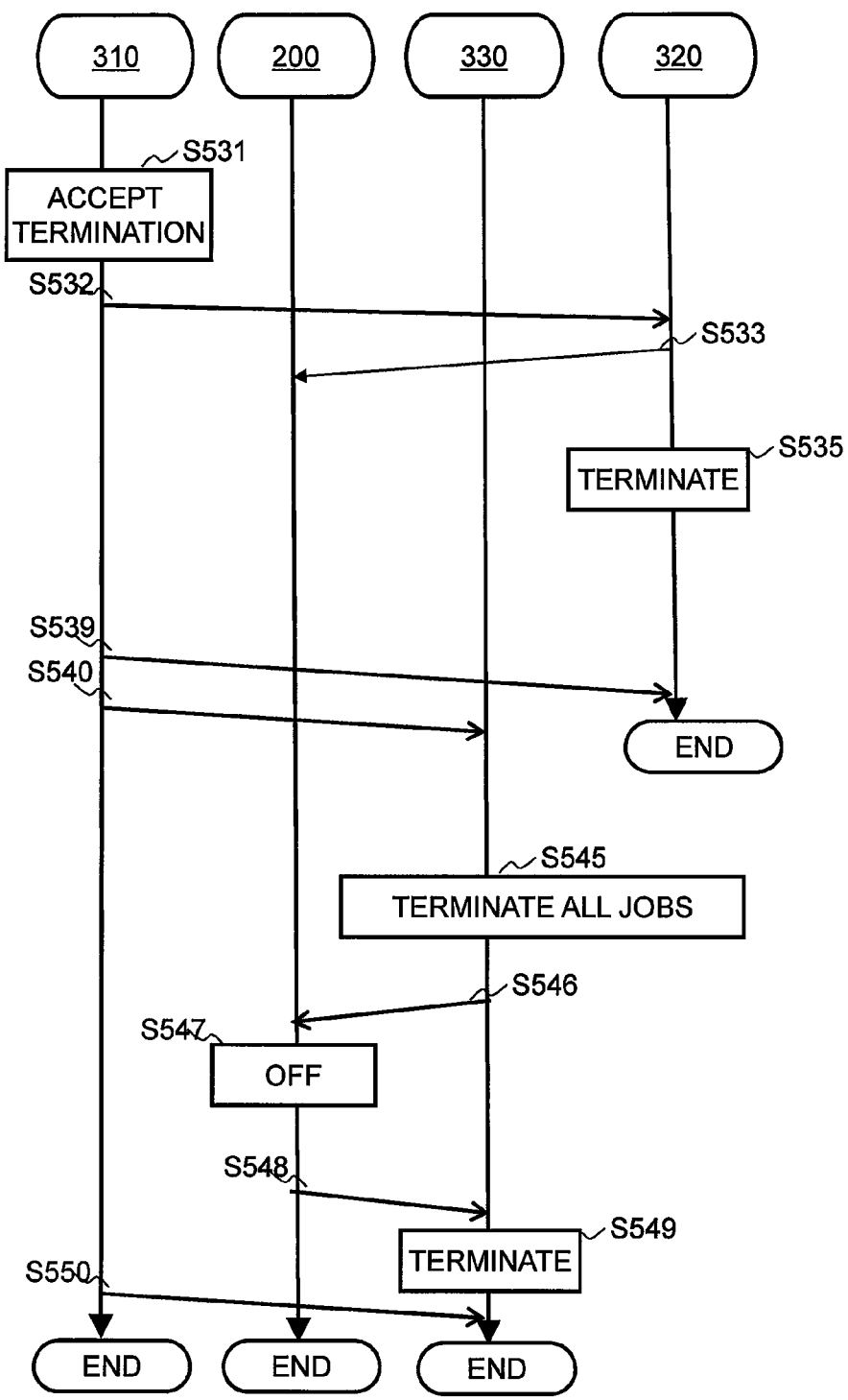
FIG. 16 is a ladder chart showing the termination processing at the host 100 related to the Embodiment 1.

FIG. 16 is a ladder chart showing the termination processing at the host 100.

The VM control module 310 accepts a termination requirement requiring the termination of the system (S531). The termination requirement may be permitted to be input by the administrator or may also be permitted to be input from another program in accordance with a specified schedule. The module 310 transmits the termination requirement to the application VM 320 (S532).

The application VM 320, in response to the termination requirement, unmounts the internal VOL (S533), and terminates the processing (S535).

The VM control module 310 confirms the termination of the application VM 320 (S539) and, after that, transmits a termination requirement to the storage control VM 330 (S540).

The start-up/termination control program 332 in the storage control VM 330, in response to the termination requirement, waits for the termination of all the jobs. After all the jobs are terminated (S545), the program 332 transmits an invalidation requirement which requires making an internal VOL invalid to the cache SSD 200 (S546).

The configuration/maintenance control program 242 in the cache SSD 200 receiving the invalidation requirement sets the ON/OFF flags 251 in all the pieces of SSD cache information 250 to OFF (S547), and returns the response to the storage control VM 330 (S548).

The program 332 in the storage control VM 330 receives the response and is terminated (S549). The VM control module 310 confirms the termination of the storage control VM 330 (S550).

Figure 17:
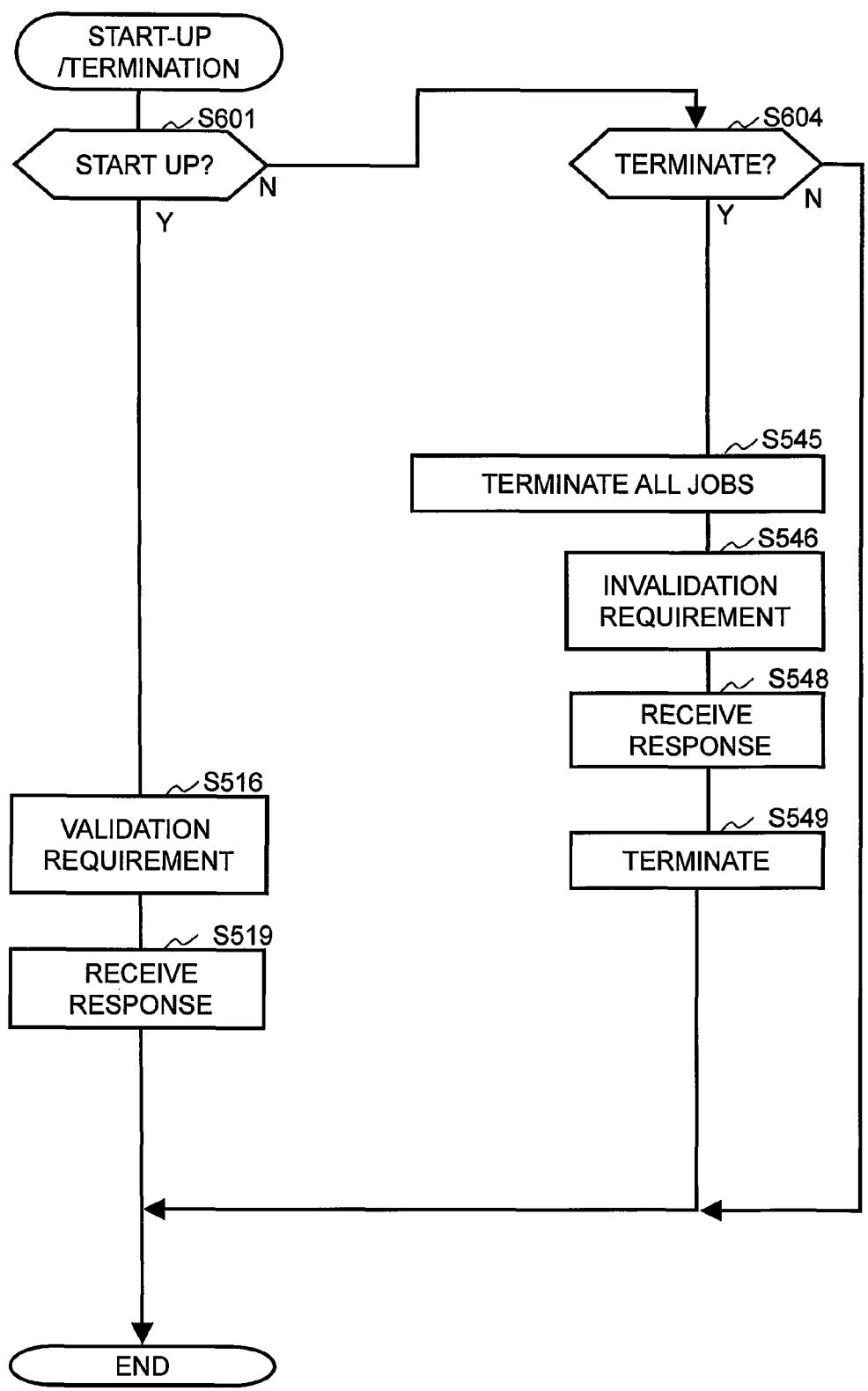
FIG. 17 is a flowchart showing a processing performed by the start-up/termination control program 332 related to the Embodiment 1.

FIG. 17 is a flowchart showing a processing performed by the start-up/termination control program 332.

The start-up/termination control program 332 determines the type of the received requirement (S601, S604).

If the requirement is a start-up requirement (S601: Y), the program 332 executes S516 and S519. As S516 and S519 are the same as S516 and S519 in FIG. 15, the description is omitted.

If the requirement is a termination requirement (S604: Y), the program 332 executes S545, S546, S548, and S549. As S545, S546, S548, and S549 are the same as S545, S546, S548, and S549 in FIG. 16, the description is omitted.

As mentioned above, according to the Embodiment 1, if the read target data complying with the read command from the application VM 320 is stored in the internal VOL (FM 210), as shown by the processing at S111: Y and later, without requiring the storage control VM 330, the read processing can be terminated. Therefore, the deterioration of the read performance can be inhibited.

Note that, in the Embodiment 1, the access processing program 333 in the storage control VM 330 (or the access processing program 241 in the cache SSD 200) may also be permitted to perform the processing below.

&The program 333 may be permitted to perform internal copy which is copying data from a primary internal VOL to a secondary internal VOL. In this case, the capacity of the primary internal VOL and the capacity of the secondary internal VOL are equal, and a block in the primary internal VOL and a block in the secondary internal VOL may correspond one to one to each other. By internal copy, the data written to a specific block in the primary internal VOL is copied to the block corresponding to the specific block in the secondary internal VOL. The secondary internal VOL does not have to be recognized by the application VM 320. Furthermore, the program 333 may be permitted to manage in which blocks of the secondary internal VOL no data is written and where difference occurs. The cache SSD 200 as the base of the primary internal VOL and the cache SSD 200 as the base of the secondary internal VOL may be permitted to be the same or may also be permitted to be different.

*The program 333 may be permitted to perform reverse internal copy (restore) which is copying data in the secondary internal VOL to the primary internal VOL. The program 333, if performing reverse internal copy, in one or more cache SSDs 200 as the bases of both of the VOLs, initializes the map tables 260 in the pieces of SSD cache information 250 corresponding to the VOLs.

Embodiment 2

The Embodiment 2 is described below with reference to FIG. 18. The parts other than FIG. 18 are the same as the Embodiment 1, and the description of the same is omitted or simplified.

In the Embodiment 2, the actual capacity 252a of an internal VOL (the storage capacity of the physical block groups allocatable to the internal VOL) may be permitted to be smaller than the storage capacity of the external VOL corresponding to the internal VOL (the virtual capacity 252b of the internal VOL may be permitted to be equal to or larger than the storage capacity of the external VOL).

Figure 18:
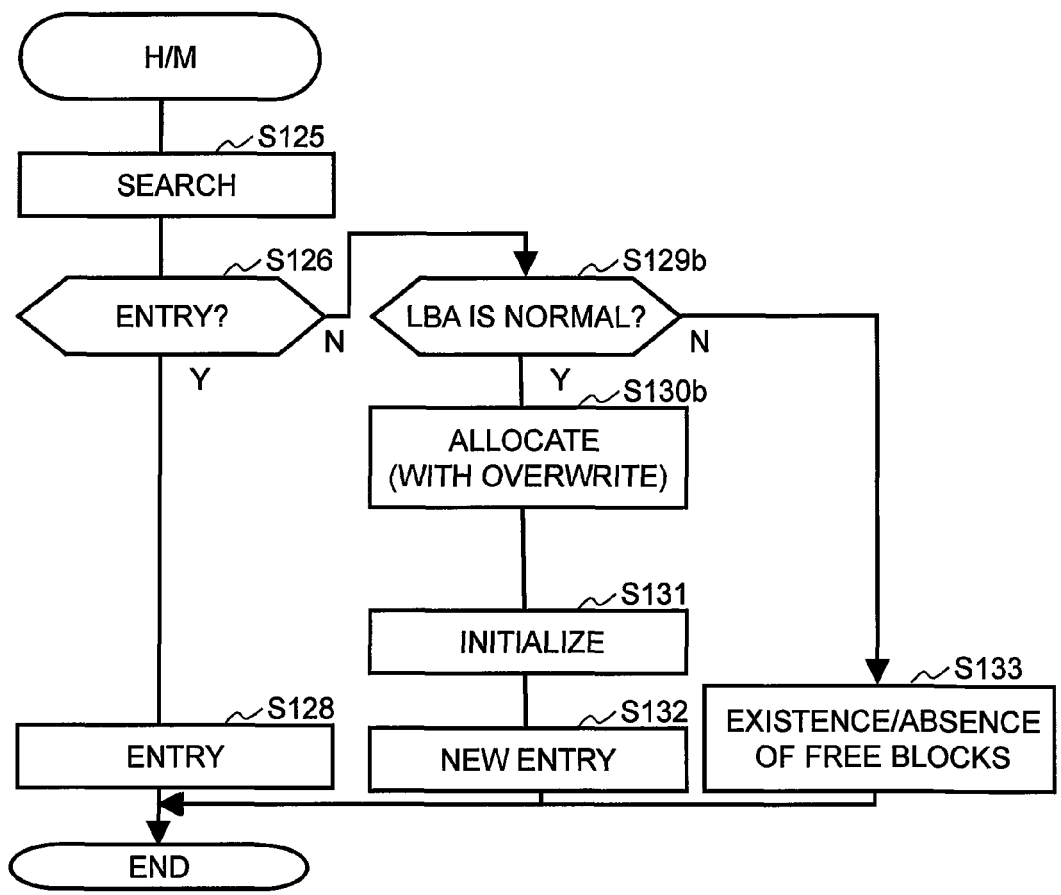
FIG. 18 is a flowchart showing the hit/miss determination processing related to the Embodiment 2.

FIG. 18 is a flowchart showing the hit/miss determination processing related to the Embodiment 2.

This hit/miss determination processing is, unlike the hit/miss determination processing shown in FIG. 6, performed by the access processing program 241 only for determining whether the access destination address identified at S104 is normal or not, and whether there are any free physical blocks in the FM 210 is not determined (S129b). Then, at S130b, the program 241, if there is no free physical block, makes some of the allocated physical blocks into free blocks and, to those physical blocks, allocates logical blocks corresponding to the access destination address. Therefore, the entries corresponding to those physical blocks (the entries in the map table 260) are updated. In this case, the data stored in the physical blocks is discarded and is overwritten with the new data. However, this is not a problem in this embodiment. This is because, in this embodiment, it is practically guaranteed that the data written to the internal VOL is also written to the external VOL. As more specifically described, it is because, according to the steps from S154 to S157 in FIG. 9, the data written to an internal VOL is written to the external VOL corresponding to the internal VOL, and then, the response to the write command (status) is transmitted to the access source (application VM 320).

According to the Embodiment 2, to an internal VOL, an external VOL whose storage capacity is larger than the storage capacity of the internal VOL can be made to correspond, and therefore, for a read in a range larger than the range of the physical storage area corresponding to the internal VOL, prevention of the performance deterioration of the read can be expected.

Embodiment 3

Next, using FIGS. from 19 to 23, the Embodiment 3 is described. As the parts other than the FIGS. from 19 to 23 are the same as the Embodiment 2, the description of the same is omitted. Note that the Embodiment 3 may be permitted to lack at least one characteristic of the Embodiments 1 and 2.

In the Embodiment 2 (and the Embodiment 1), an internal VOL is managed in units of storage areas (e.g., in units of logical blocks) with the storage capacity equal to the storage capacity of a physical block in the FM 210. However, in the Embodiment 3, an internal VOL is managed in units of smaller storage areas.

Figure 19:
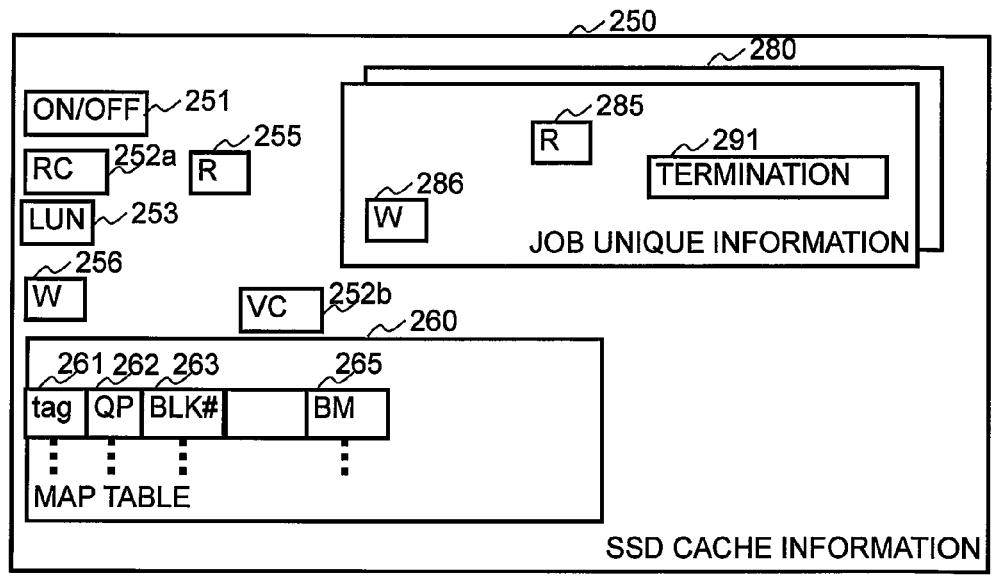
FIG. 19 shows SSD cache information 250 related to the Embodiment 3.

FIG. 19 shows SSD cache information 250 related to the Embodiment 3.

According to this figure, unlike the Embodiment 2 (FIG. 2), each entry configuring the map table 260 includes a staging bitmap 265. The staging bitmap 265 is a bitmap showing in which range of a physical block in the FM 210 valid data is put. That is, each bit configuring the bitmap 265 corresponds to the storage area configuring a physical block, and shows whether valid data exists in the storage or not.

Note that the information showing in which range of a physical block valid data is put may also be permitted to be in other forms than the bitmap form (e.g., a table).

Furthermore, the capacity of the storage area corresponding to a bit may be permitted to be equal to the minimum size of the data written or read in accordance with an access command in the host 100. For example, it may be permitted that a physical block is 256 KB (kilobytes) while the capacity of the storage area corresponding to a bit (the minimum size of the data complying with one access in the host 100) is 512 B (bytes) or 4 KB.

Figure 20:
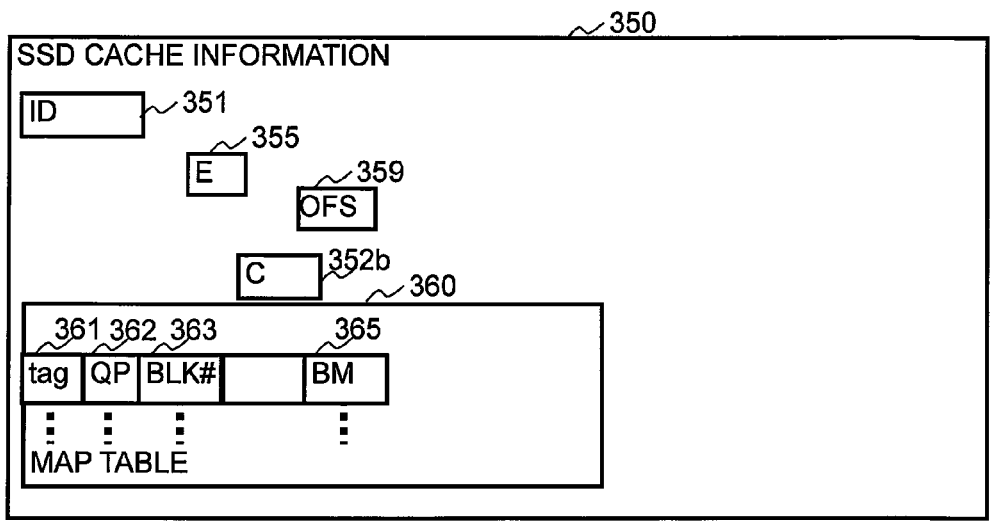
FIG. 20 shows SSD cache information 350 related to the Embodiment 3.

FIG. 20 shows SSD cache information 350 related to the Embodiment 3.

According to this figure, unlike the Embodiment 2 (FIG. 3), each entry of the map table 360 includes a staging bitmap 365. This bitmap 365 is the same as the above-mentioned bitmap 265. This is because the map table 360 is the copy of the map table 260.

Figure 21:
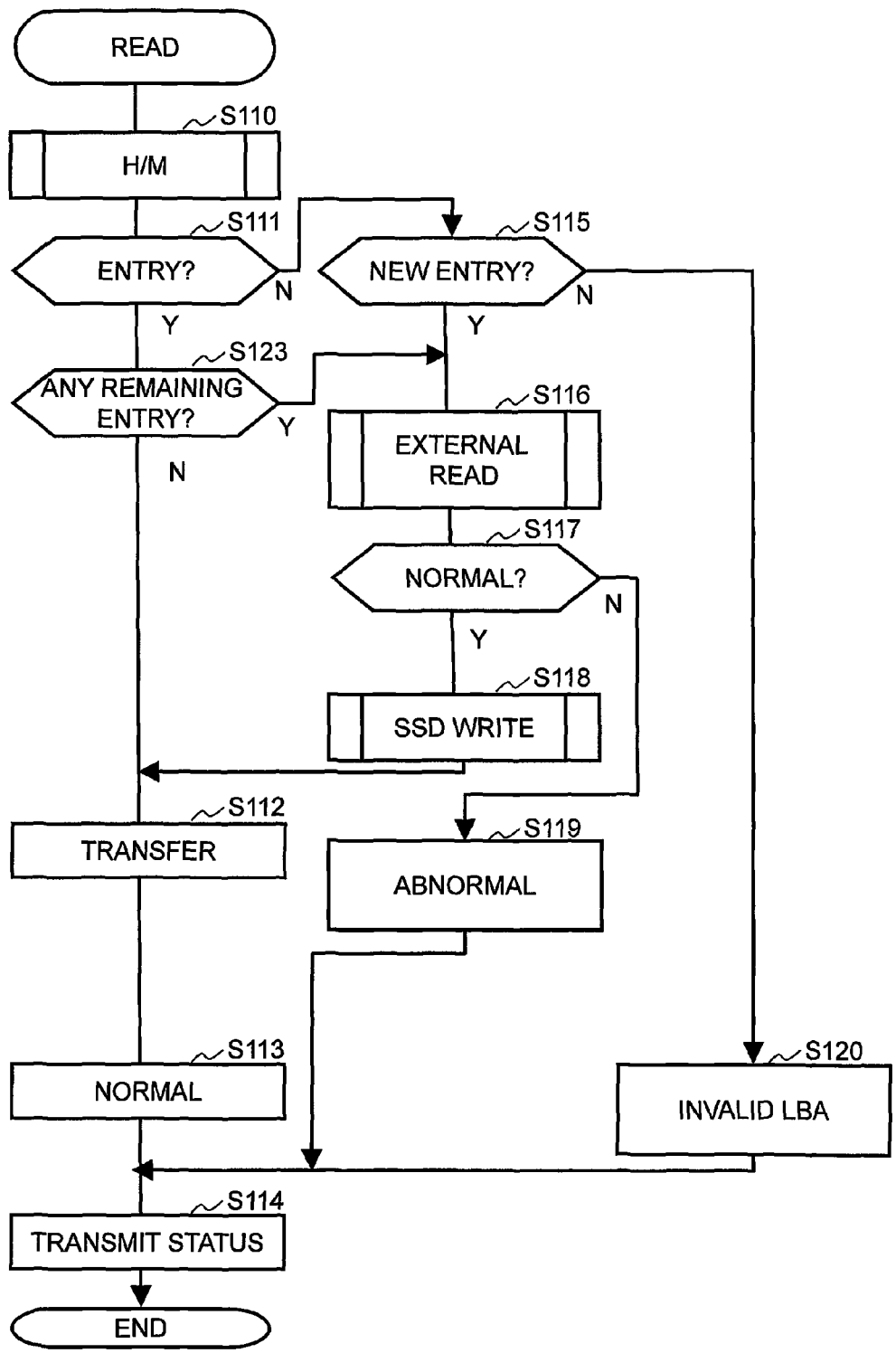
FIG. 21 is a flowchart showing the read processing in the cache SSD 200 related to the Embodiment 3.

FIG. 21 is a flowchart showing the read processing in the cache SSD 200 related to the Embodiment 3.

This read processing, unlike the Embodiment 2 (FIG. 5), includes S123 after S111: Y.

At S123, the access processing program 241 determines whether the read target data complying with the read command from the access source exists in the access destination internal VOL or not. As more specifically described, the program 241 performs the processing below. The program 241 refers to the staging bitmap 265 which the entry corresponding to the access destination address (the entry in the map table 260) comprises. Then, the program 241 determines whether all the bits corresponding to all the storage areas (the storage areas in the FM 210) corresponding to the access range shown by the access destination address are ON or not.

If the result of the determination at S123 is positive (S123: Y), at S112, the read target data is read from the access destination internal VOL.

If the result of the determination at S123 is negative (S123: N), that is, if at least one bit is OFF, the processing at S116 and later is performed. That is, among the read target data, the data which is not in the access destination internal VOL (the data corresponding to the bit which is OFF) is read from the external VOL, and the data is written to the access destination internal VOL. This means that, in the access destination internal VOL, the read target data exists (is completed).

Figure 22:
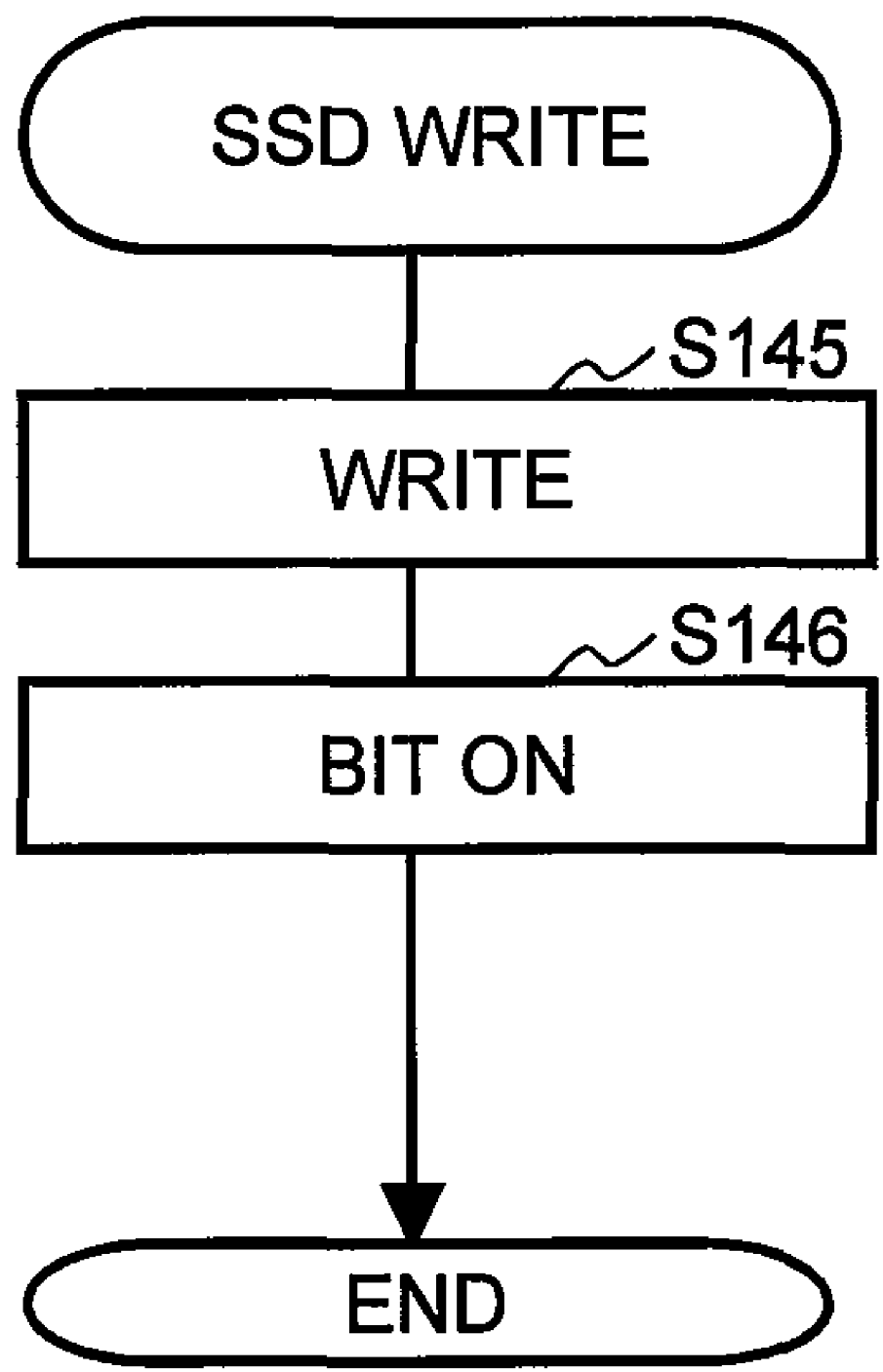
FIG. 22 is a flowchart showing SSD write related to the Embodiment 3.

FIG. 22 is a flowchart showing SSD write related to the Embodiment 3.

According to this figure, unlike the Embodiment 2 (FIG. 8), the program 241, after writing the data read from the external VOL to the physical block (S145), sets the bit corresponding to each storage area configuring the range to which the data is written in the physical block (the bit in the staging bitmap 365 corresponding to the physical block) to ON (S146).

Figure 23:
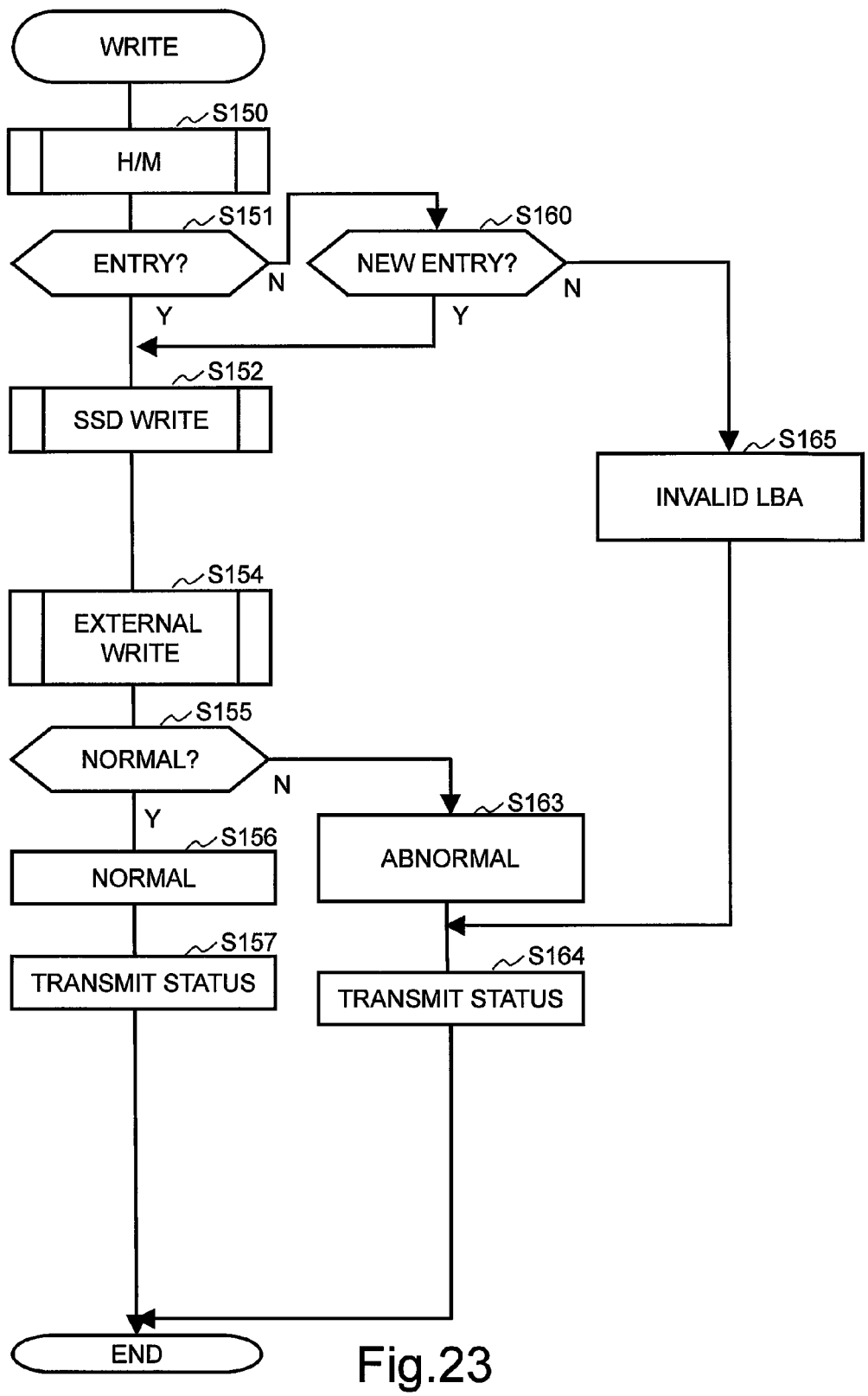
FIG. 23 is a flowchart showing the write processing in the cache SSD 200 related to the Embodiment 3.

FIG. 23 is a flowchart showing the write processing in the cache SSD 200 related to the Embodiment 3.

According to this figure, unlike the Embodiment 2 (FIG. 9), the program 241, in case of allocating a new entry (S160: Y), does not perform the read from the external VOL (S161 and S162 in FIG. 9). This is because, in this embodiment, data does not have to be put in the entire physical block, that is, data input/output can be performed in units of smaller storage areas than physical blocks.

According to the Embodiment 3, the existence/absence of data in the internal VOL can be managed in units of smaller storage areas than the blocks. Therefore, the capacity efficiency can be improved. Furthermore, as S161 and S162 shown in FIG. 9 are not required in the write processing, there are some cases where the efficiency of the write processing is improved.

Embodiment 4

Next, using FIGS. from 24 to 31, the Embodiment 4 is described. As the parts other than the FIGS. from 24 to 31 are the same as the Embodiment 3, the description of the same is omitted. Note that the Embodiment 4 may be permitted to lack at least one characteristic of the Embodiments from 1 to 3.

In the Embodiment 4, write to the external VOL is performed asynchronously with write to the internal VOL. As more specifically described, in the Embodiment 4, when the write target data complying with the write command from the access source (application VM 320) is written to the access destination internal VOL, the response is returned to the access source, and then, the write target data in the access destination internal VOL is written to the external VOL corresponding to the access destination internal VOL. By this means, in the write processing in the cache SSD 200, the length of time from when the access source transmits the write command until the access source receives the response to the write command can be shortened compared with the write processing in the Embodiment 3.

Figure 24:
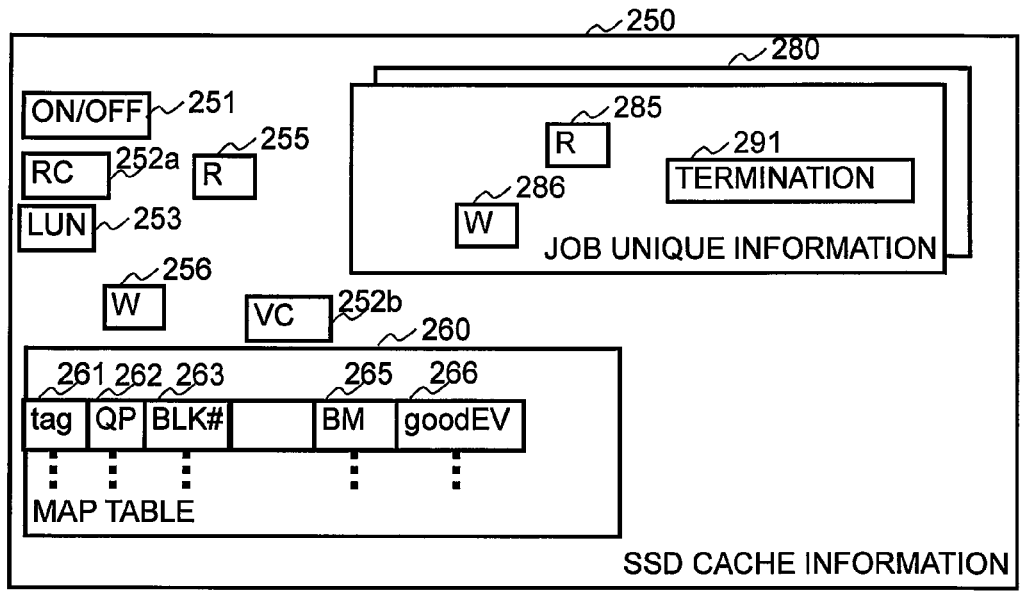
FIG. 24 shows SSD cache information 250 related to the Embodiment 4.

FIG. 24 shows SSD cache information 250 related to the Embodiment 4.

According to this figure, unlike the Embodiment 3 (FIG. 19), each entry in the map table 260 comprises a goodEV flag 266. The goodEV flag 266 shows whether the data in the storage area corresponding to the flag 266 is already written to the external VOL or not. The flag 266 is OFF when data is written to the internal VOL. The flag 266 is set to ON when a write requirement for writing the data to the external VOL is transmitted and the response (the status) indicating normal to the write requirement is returned.

Note that, in the Embodiment 4, all the entries do not have to comprise bitmaps 265. That is, in the Embodiment 4, instead of the internal VOL being managed in units of smaller storage areas than the blocks, the internal VOL may also be permitted, like the Embodiments 1 and 2, to be managed in units of blocks.

Figure 25:
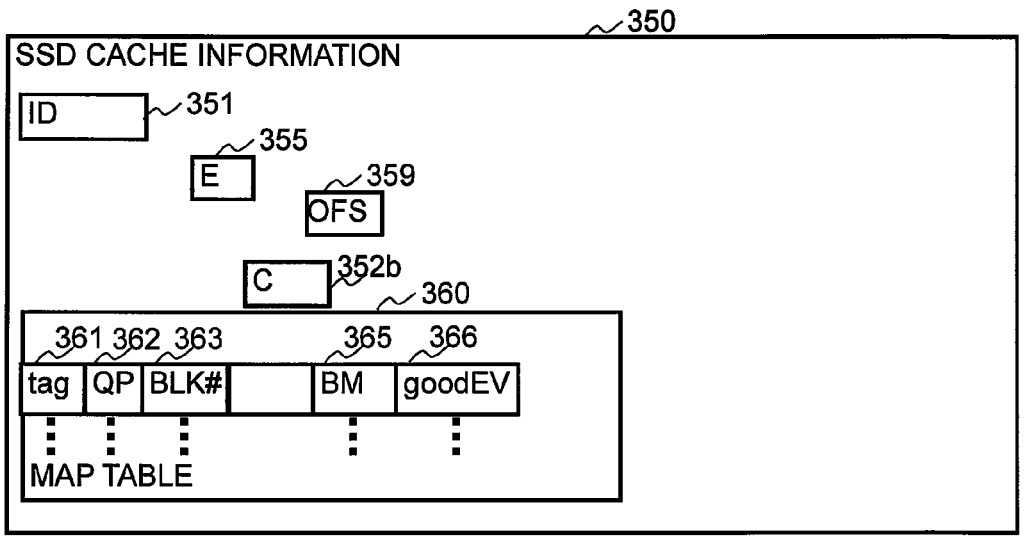
FIG. 25 shows SSD cache information 350 related to the Embodiment 4.

FIG. 25 shows SSD cache information 350 related to the Embodiment 4.

According to this figure, unlike the Embodiment 3 (FIG. 25), each entry in the map table 260 comprises a goodEV flag 266 as in the table 260 in FIG. 24.

Figure 26:
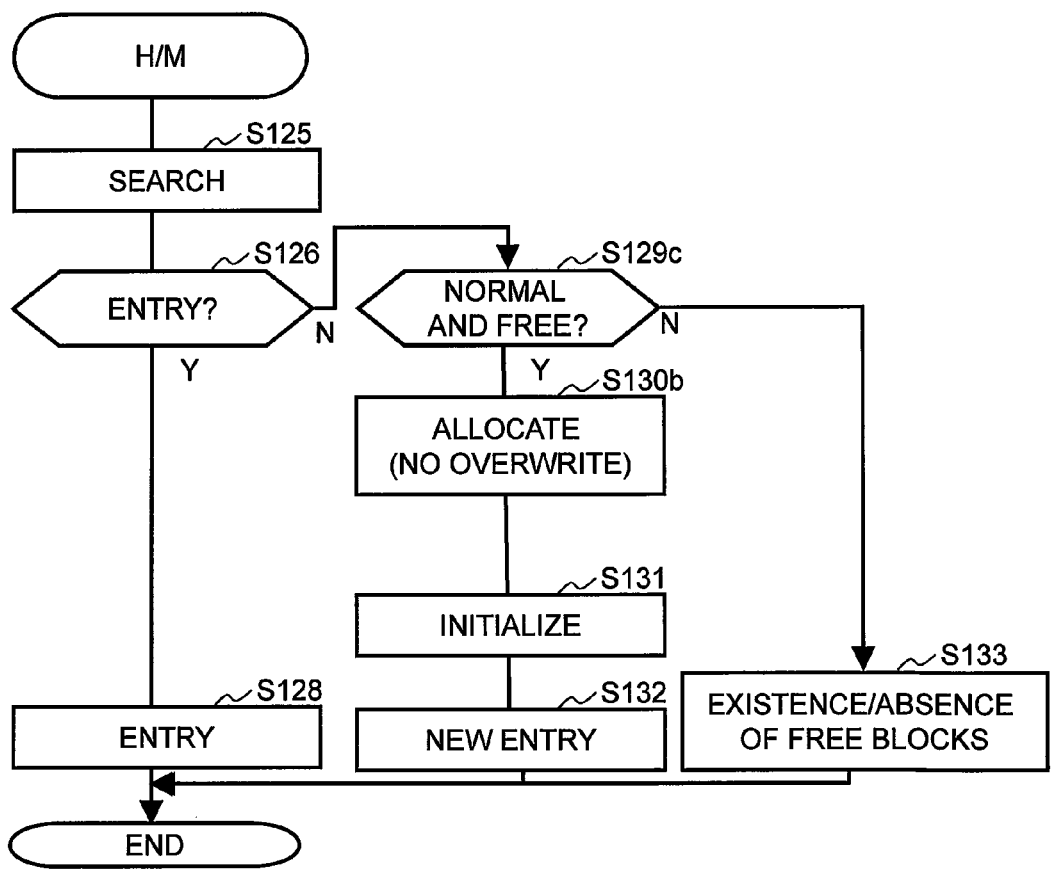
FIG. 26 is a flowchart showing the hit/miss determination processing related to the Embodiment 4.

FIG. 26 is a flowchart showing the hit/miss determination processing related to the Embodiment 4.

According to this figure, instead of S129*b* in FIG. 18 (or S129*a* in FIG. 6), S129*c* is performed. At S129*c*, the program 241 performs the determination whether the access destination address (e.g., the LBA) is normal or not and the determination whether there is any free entry or used entry whose goodEV flag 266 is ON or not.

The data in the physical block corresponding to the used entry whose goodEV flag 266 is OFF (data written from the access source) is not written to the external VOL yet. Therefore, the data in the physical blocks must not be erased. That is, S130*b* must not be performed. Therefore, in this case, the result of S129*c* is negative.

Figure 27:
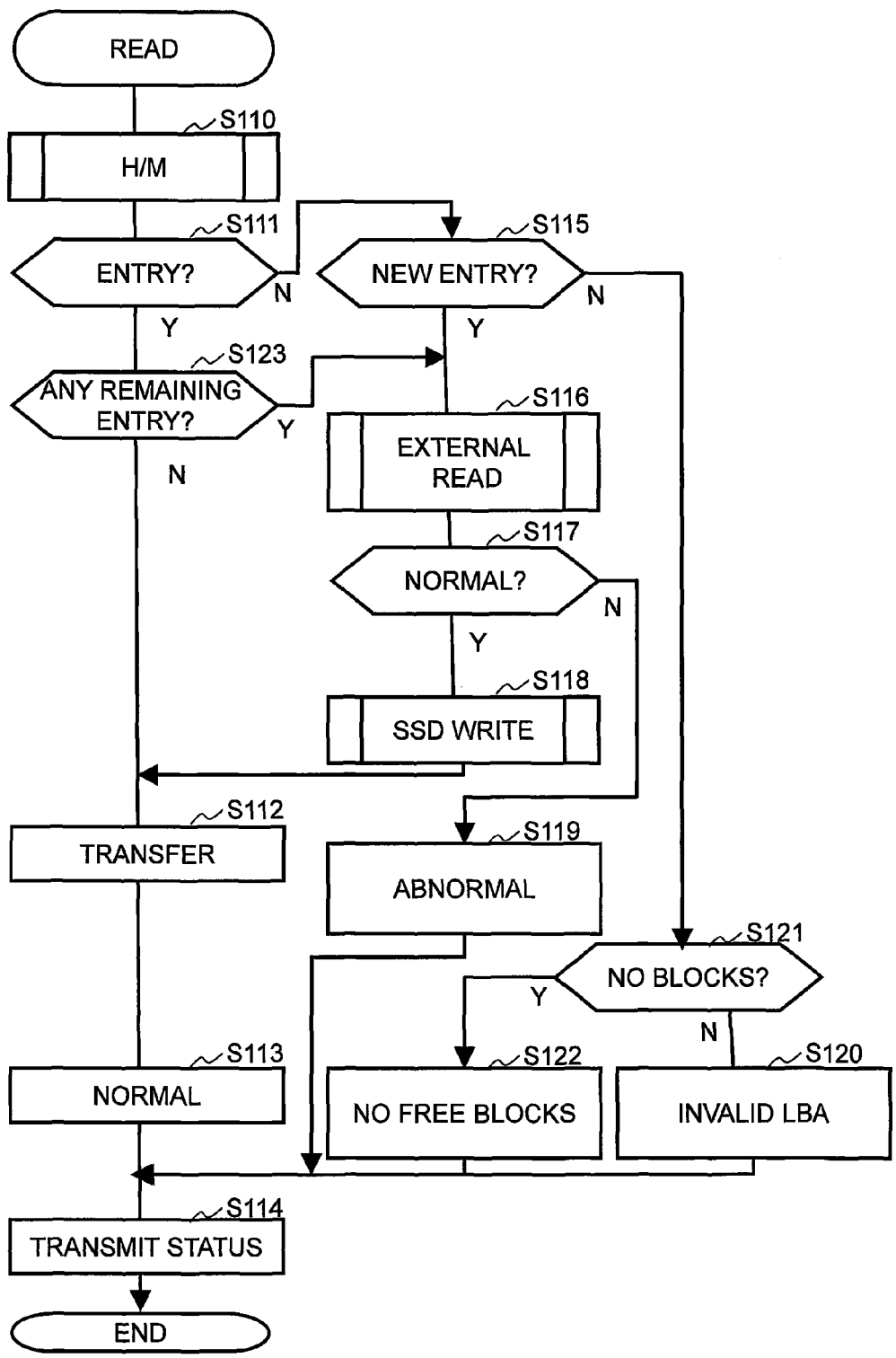
FIG. 27 is a flowchart showing the read processing in the cache SSD 200 related to the Embodiment 4.

FIG. 27 is a flowchart showing the read processing in the cache SSD 200 related to the Embodiment 4.

According to this figure, unlike the Embodiment 3 (FIG. 21), in the read processing, after S115: N, S121 and S122 are performed.

That is, the cause of S115: N might be, instead of or in addition to that the access destination address is invalid, that there is no physical block allocatable to the logical blocks corresponding to the access destination address (there is no free entry and there is no used entry whose goodEV flag 266 is ON). Therefore, the program 241 determines at S121 whether there is any allocatable block or not. If there is no allocatable block (S121: Y), the program 241 sets the information indicating that there is no free block as the termination status 291 corresponding to this read processing (job) (S122). Then, the program 241 transmits the status showing abnormal to the access source (S114).

Figure 28:
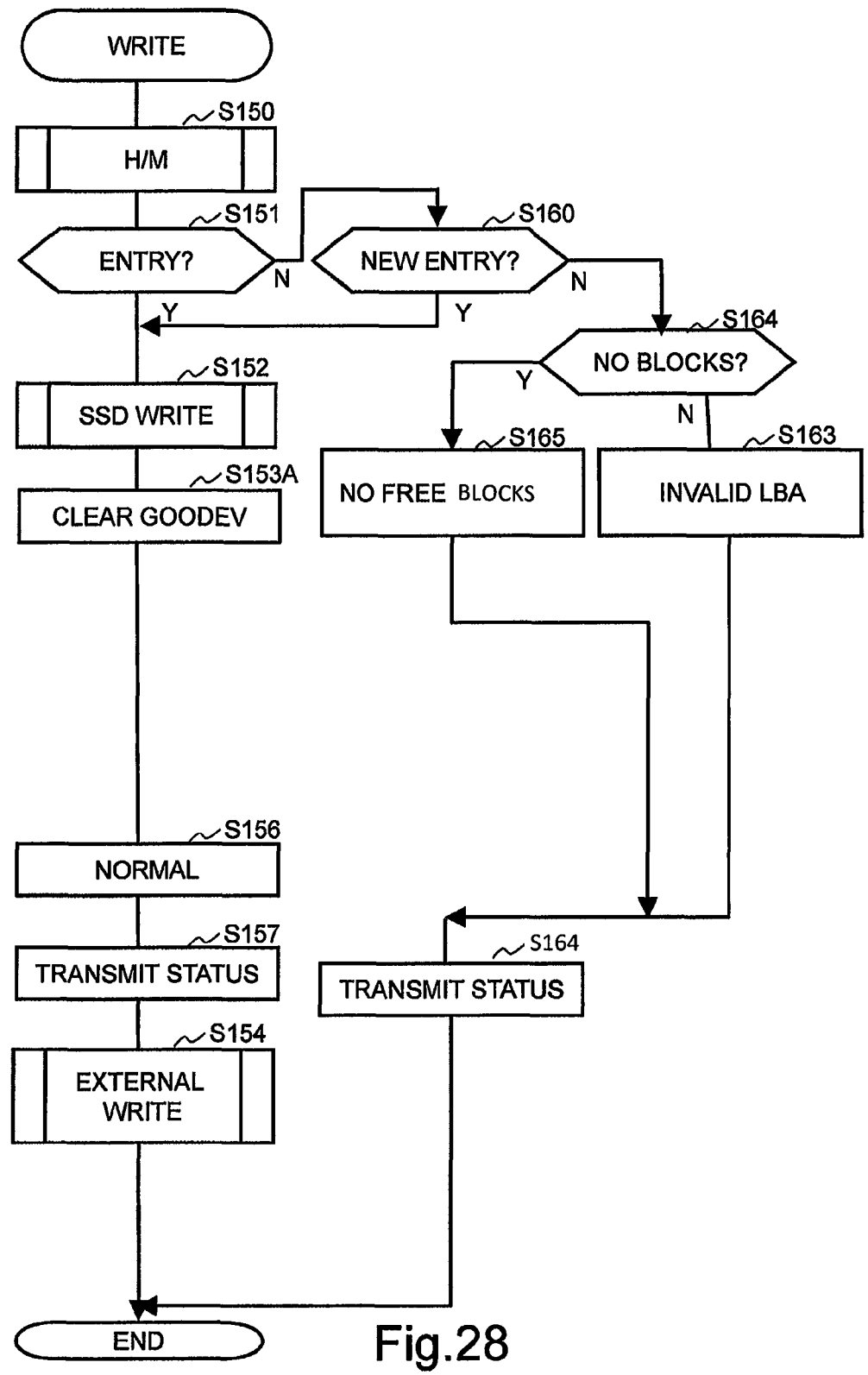
FIG. 28 is a flowchart showing the write processing in the cache SSD 200 related to the Embodiment 4.

FIG. 28 is a flowchart showing the write processing in the cache SSD 200 related to the Embodiment 4.

According to this figure, the write processing related to the Embodiment 4 has the differences shown below from the write processing related to the Embodiment 3 (FIG. 23.)

That is, after S160: N, S164 and S165 are performed. The reason is the same as the reason of performing S121 and S122 after S115: N in the read processing shown in FIG. 27.

S153*a* is performed after S152. At S153*a*, the program 241 sets the goodEV flag 266 in the entry detected at S150 to OFF. By this means, the entry shows that the data in the block corresponding to this entry is not written to the external VOL yet.

S155 and S163 of FIG. 23 are not performed.

S154 (external write request processing) is performed after S157, not before S156. That is, after the termination status to the write command is returned to the access source (the application VM 320), the data complying with the write command is written from the internal VOL to the external VOL. That is, the data write to the external VOL is performed asynchronously with the data write to the internal VOL.

Figure 29:
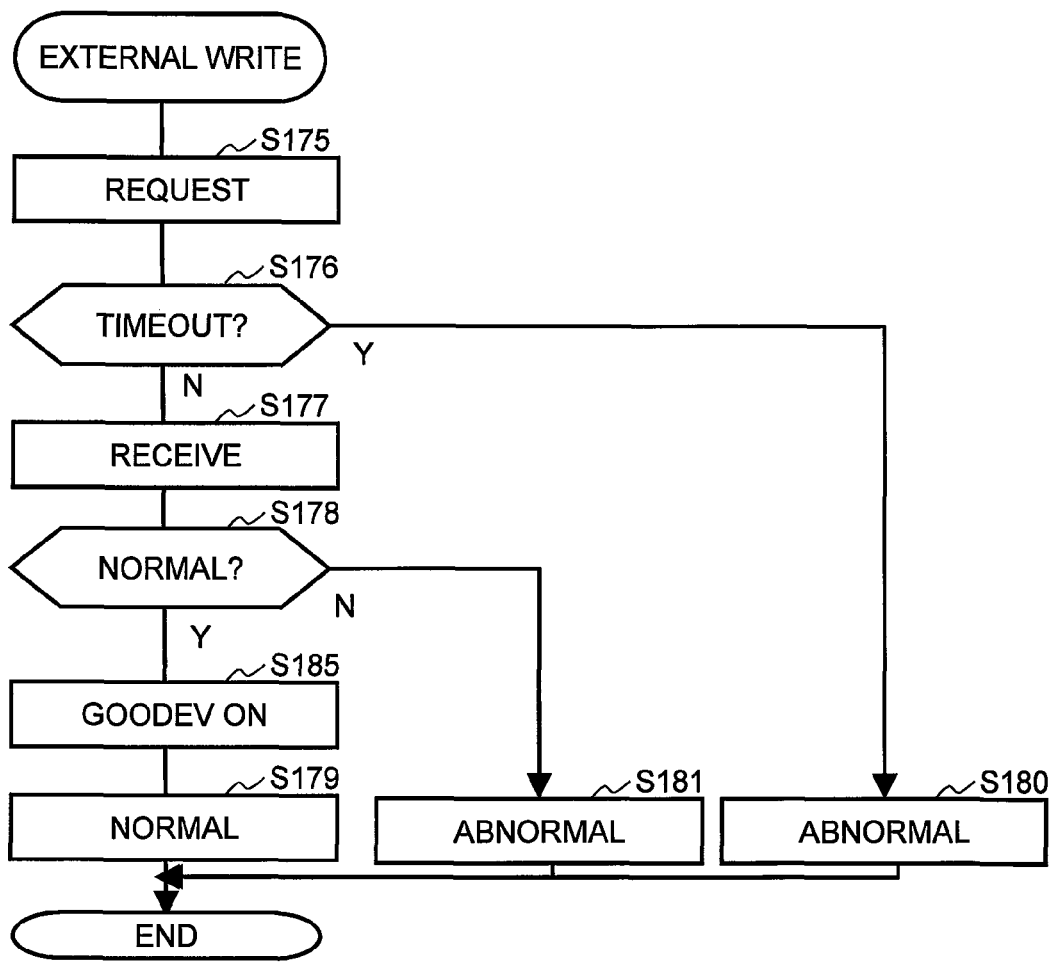
FIG. 29 is a flowchart showing the external write request processing related to the Embodiment 4.

FIG. 29 is a flowchart showing the external write request processing related to the Embodiment 4.

According to this figure, unlike the Embodiment 3 (FIG. 10), S185 is performed after S178: Y. At S185, the program 241 sets the goodEV flag 266 which was set to OFF at S153*a* in FIG. 28 to ON. S185 is performed if the program 241 receives the response showing normal from the storage control VM 330 (that is, if the data in the internal VOL is written to the external VOL).

Figure 30:
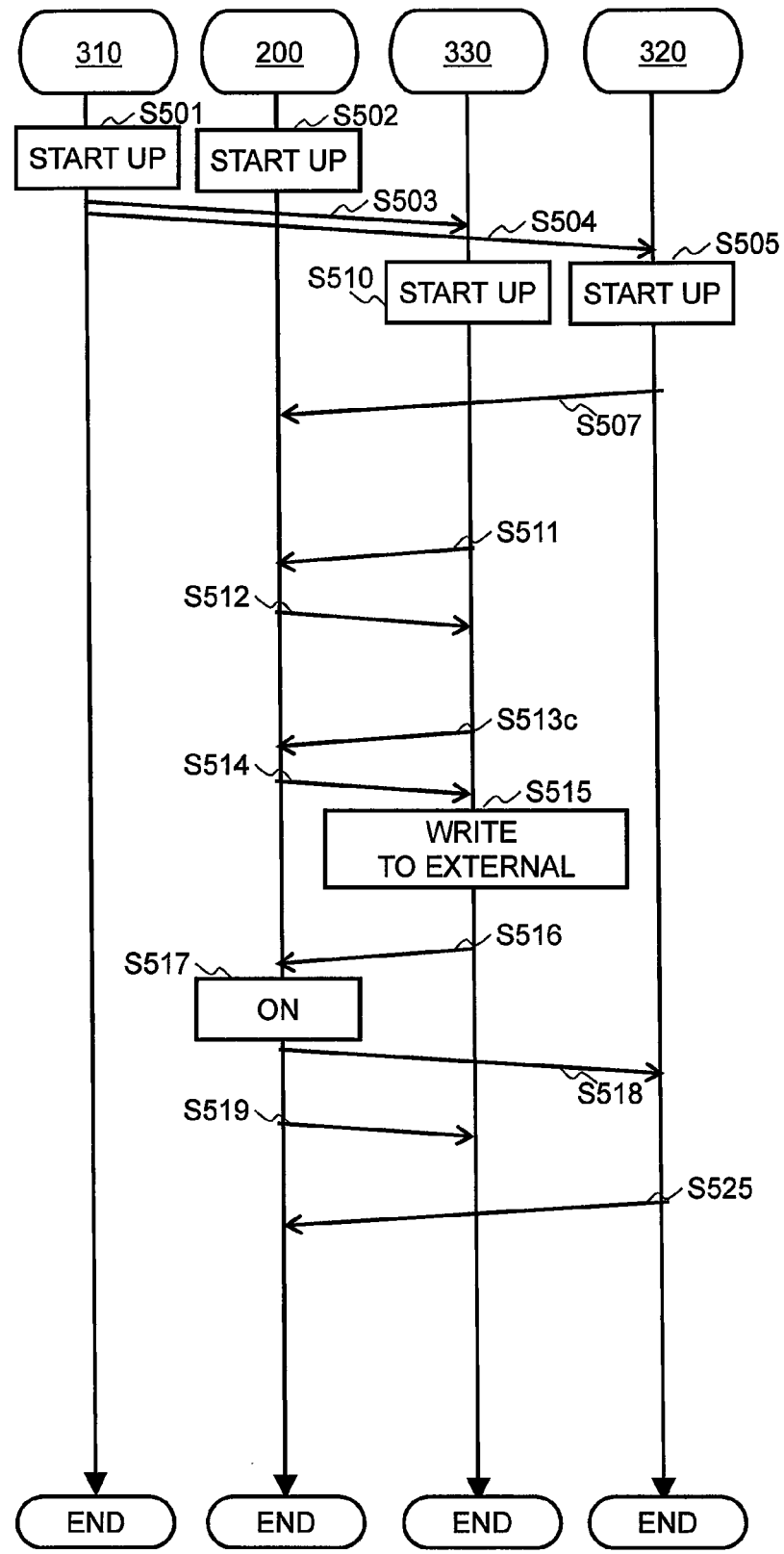
FIG. 30 is a ladder chart showing the start-up processing at the host 100 related to the Embodiment 4.

FIG. 30 is a ladder chart showing the start-up processing at the host 100 related to the Embodiment 4.

According to this figure, unlike the Embodiment 3 (FIG. 15), between S507 and S516, the data existing in the internal VOL but not in the external VOL is written to the external VOL. As more specifically described, S511, S512, S513*c*, S514, and S515 are performed.

At S511, the program 332 in the storage control VM 330 requires a map table 260 from the cache SSD 200.

At S512, the program 242 in the cache SSD 200 returns the map table 260 to the storage control VM 330. The program 332 in the VM 330 generates a copy of the returned table 260 (map table 360).

At S513*c*, the program 332 requires the data in the block corresponding to the entry whose goodEV flag 366 is OFF (the entry in the table 360) from the cache SSD 200. In this case, for example, the tag 361 is specified.

At S514, the program 241 in the cache SSD 200 returns the required data to the VM 330. As more specifically described, for example, the program 241 acquires the data from the block identified by the tag specified by the requirement as a key (specifically, for example, the area corresponding to the ON bits in the bitmap 265), and returns the acquired data.

At S515, the program 241 writes the data from the cache SSD 200 to the external VOL shown by the external VOL identifier 355 in the SSD cache information 350 including the map table 360 referred to at S513c.

Note that the steps from S511 to S515 may also be permitted to be performed separately multiple times for improving the transfer efficiency.

By the steps from S511 to S515, the data which was not written to the external VOL due to a failure in the storage control VM 330 or other causes (the data in the internal VOL) can be written to the external VOL triggered by the restart of the storage control VM 330.

Note that the steps from S511 to S515 may also be permitted to be performed at, instead of or in addition to the time of start-up, an arbitrary point of time in the period in which the storage control VM 330 is operating.

Figure 31:
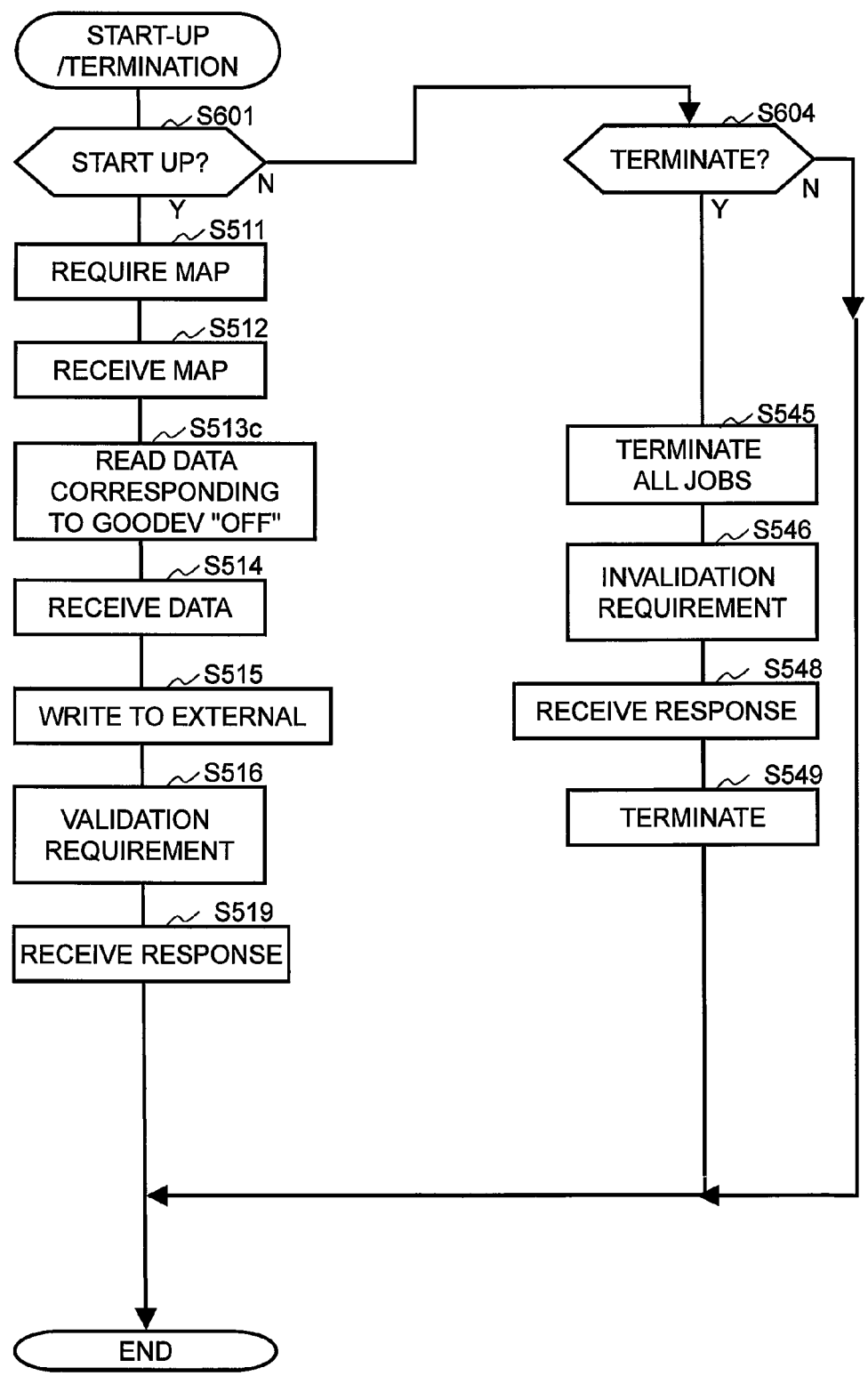
FIG. 31 is a flowchart showing a processing performed by the start-up/termination control program 332 related to the Embodiment 4.

FIG. 31 is a flowchart showing a processing performed by the start-up/termination control program 332 related to the Embodiment 4.

According to this figure, unlike the Embodiment 3 (FIG. 17), the above-mentioned steps from S511 to S515 are performed. However, as the steps S511 to S515 are already described, the description is omitted.

According to the Embodiment 4, write to the external VOL is performed asynchronously with write to the internal VOL. By this means, in the write processing in the cache SSD 200, the length of time from when the access source transmits the write command until the access source receives the response to the write command can be shortened compared with the write processing in the Embodiment 3.

Embodiment 5

Next, using FIGS. from 32 to 35, the Embodiment 5 is described. As the parts other than the FIGS. from 32 to 35 are the same as the Embodiment 4, the description of the same is omitted. Note that the Embodiment 5 may be permitted to lack at least one characteristic of the Embodiments 1 and 4.

Figure 32:
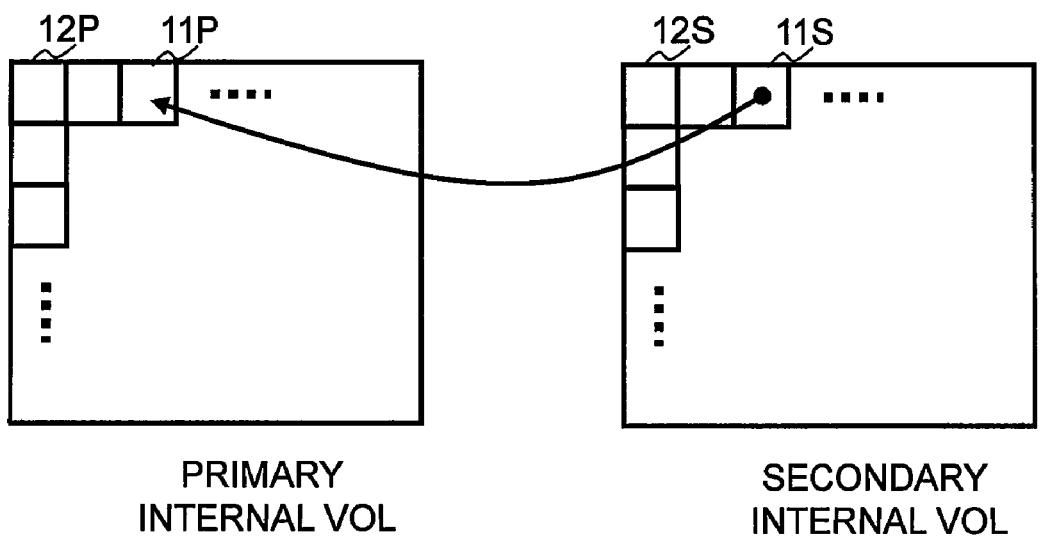
FIG. 32 is a diagram showing reverse internal copy related to the Embodiment 5.

In the Embodiment 5, as for reverse internal copy, only differential copy is performed. As more specifically described, as shown in FIG. 32, about reverse internal copy related to the Embodiment 5, only the data copy from the secondary differential block (the differential block in the secondary internal VOL) 11S to the primary differential block (the differential block in the primary internal VOL) 11P corresponding to the differential block is performed, and the copy from the secondary non-differential block 12S to the primary non-differential block 12P corresponding to the non-differential block is not performed. A "differential copy" is the block in which internal copy (data copy from the primary block to the secondary block) is not completed (that is, the block storing the data which is not consistent between the primary block and the secondary block). A "non-differential block" is the block in which internal copy is completed (that is, the block storing the data which is consistent between the primary block and the secondary block).

Figure 33:
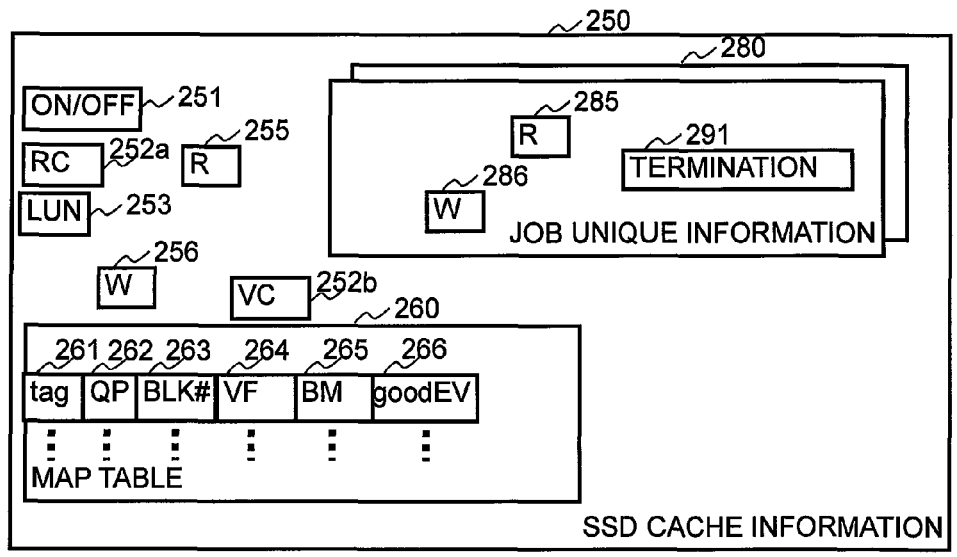
FIG. 33 shows SSD cache information 250 related to the Embodiment 5.

FIG. 33 shows SSD cache information 250 related to the Embodiment 5.

According to this figure, unlike the Embodiment 4 (FIG. 24), each entry in the map table 260 comprises a temporary release flag 264. The temporary release flag 264 shows whether the entry comprising the flag 264 is released or not. The entry is released if the flag 264 is ON and the entry is not released if the flag 264 is OFF.

In the Embodiment 5, at the time of reverse internal copy, instead of initializing the map table 260 corresponding to the primary internal VOL (the internal VOL as the copy destination of reverse internal copy), the program 333 in the VM 330 sets the temporary release flags 264 in the entry corresponding to all the blocks allocated to the primary internal VOL (the flags 264 in all the used entries in the map table 260 corresponding to the primary internal VOL) ON.

After that, the program 333 in the VM 330, in reverse internal copy, each time data copy from a secondary differential block to a primary differential block is completed, sets the temporary release flag 264 in the entry corresponding to the primary differential block OFF. That is, each time restore in a differential block is completed, the physical block corresponding to the primary differential block is changed from the released status to the unreleased status. Furthermore, when reverse internal copy is completed, the program sets the temporary release flags 264 in the entries corresponding to all the blocks allocated to the primary internal VOL OFF. Therefore, along all the physical blocks allocated to the primary internal VOL, the non-differential blocks which the application VM 320 did not access remain temporarily released and not released in reverse internal copy.

Figure 34:
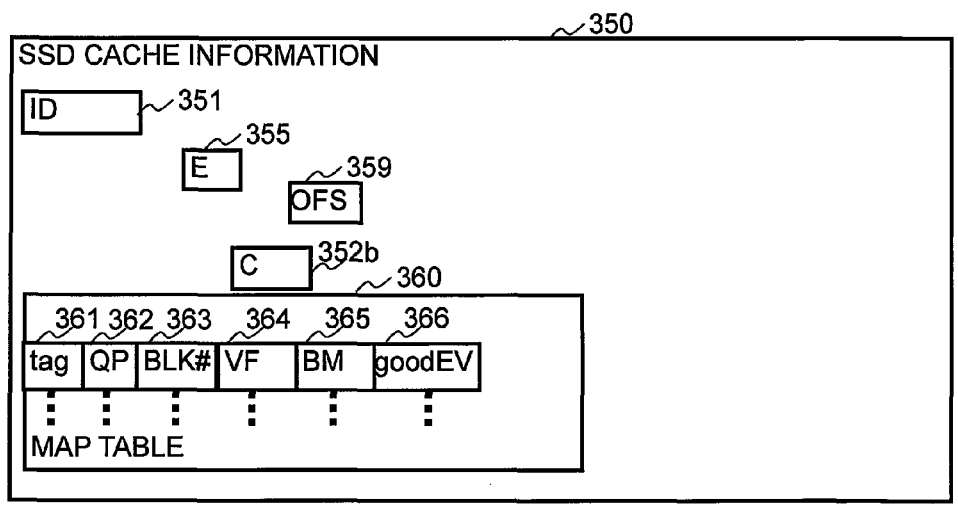
FIG. 34 shows SSD cache information 350 related to the Embodiment 5.

FIG. 34 shows SSD cache information 350 related to the Embodiment 5.

According to this figure, unlike the Embodiment 4 (FIG. 25), each entry in the map table 360 comprises a temporary release flag 364. The table 360 is the copy of the map table 260 as mentioned above.

Figure 35:
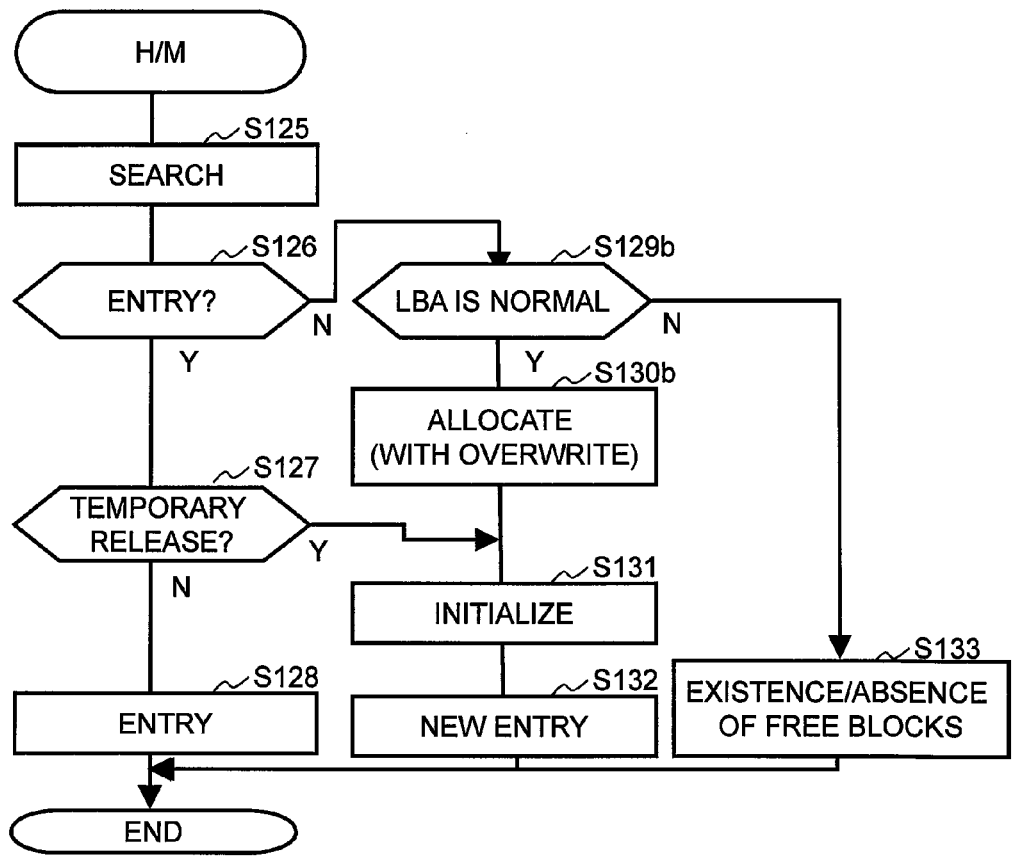
FIG. 35 is a flowchart showing the hit/miss determination processing related to the Embodiment 5.

FIG. 35 is a flowchart showing the hit/miss determination processing related to the Embodiment 5.

In the Embodiment 5, even in process of reverse internal copy, the cache SSD 200 accepts an access command from the application VM 320. Therefore, the hit/miss determination processing related to the Embodiment 5 is as follows.

That is, according to this figure, unlike the Embodiment 4 (FIG. 26), S127 is performed after S126: Y. At S127, the program 241 determines whether the temporary release flag 264 in the entry detected at S125 is ON or not.

If the temporary release flag 264 is OFF (S127: N), the program 241 performs S128. This is because the physical block corresponding to the flag 266 is in the unreleased status.

If the temporary release flag 266 is ON (S127: Y), the program 241 performs S131 for the entry comprising the flag 264. This is because the physical block corresponding to the flag 264 is in the released status.

According to the description above, the program 241 performs the processing below.

*The program 241, if receiving a read command from the application VM 320 and if the temporary release flag 264 for the block corresponding to the access destination address is ON, transmits a read request to the storage control VM 330. That is, in this case, the data is read from the external VOL.

*The program 241, if receiving a read command from the application VM 320 and if the temporary release flag 264 for the block corresponding to the access destination address is OFF, does not transmit a read request to the storage control VM 330 and reads data from the block. This is because, if the temporary release flag 264 is OFF, it is guaranteed that the read target data is in the block.

*The program 241, if receiving a write command from the application VM 320 and if the temporary release flag 264 for the block corresponding to the access destination address is ON, discards the data in the block once to set the flag 264 OFF and, at the same time, writes the write target data to the block. The write target data is also written to the external VOL.

*The program 241, if receiving a write command from the application VM 320 and if the temporary release flag 264 for the block corresponding to the access destination address is OFF, writes the write target data to the block. The data is also written to the external VOL.

Note that the program 333 (or the program 241) manages which block in the primary internal VOL is a differential block. As more specifically described, for example, the program 333 (or the program 241), if writing data to the first block of the primary internal VOL, manages the first block as a differential block. Meanwhile, for example, the program 333 (or the program 241), if copying the data to the second block of the secondary internal VOL corresponding to the first block, manages the first block as a non-differential block. The program 333 (or the program 241), if the application VM 320 writes data to the first block managed as a differential block, sets the temporary release flag 264 corresponding to the first block OFF and, at the same time, manages the first block as a non-differential block. This prevents data overwritten by reverse internal copy to the first block for which the write was performed.

According to the Embodiment 5, the release of physical blocks corresponding to non-differential blocks is avoided and data transfer to the primary internal VOL is performed only for differential blocks, which can reduce the performance deterioration after reverse internal copy.

Embodiment 6

Next, using FIGS. from 36 to 42, the Embodiment 6 is described. As the parts other than the FIGS. from 36 to 42 are the same as the Embodiment 5, the description of the same is omitted. Note that the Embodiment 6 may be permitted to lack at least one characteristic of the Embodiments 1 to 5.

In the Embodiment 6, failures due to false termination of the storage control VM 330 can be avoided. For example, manual termination of the storage control VM 330 while the internal VOL based on the cache SSD 200 is recognized by the application VM 320 can be avoided.

Figure 36:
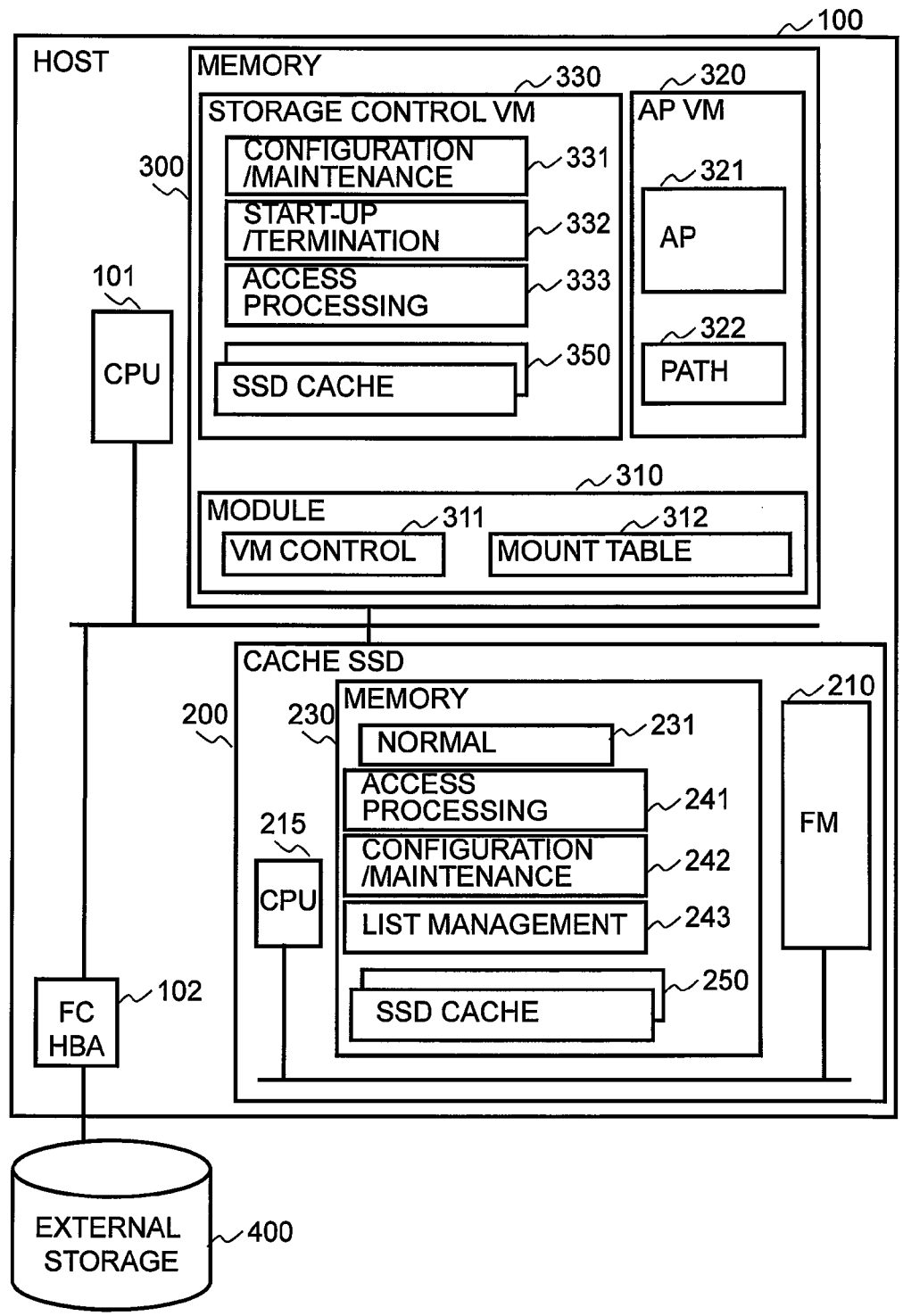
FIG. 36 shows the entire configuration of the computer system related to the Embodiment 6.

FIG. 36 shows the entire configuration of the computer system related to the Embodiment 6.

According to this figure, unlike the Embodiment 5 (FIG. 1), the VM control module 310 manages a mount table 312. The mount table 312 shows the correspondence relation between the identifier of the application VM 320 and the identifier of the internal VOL which the application VM 320 mounts.

Figure 37:
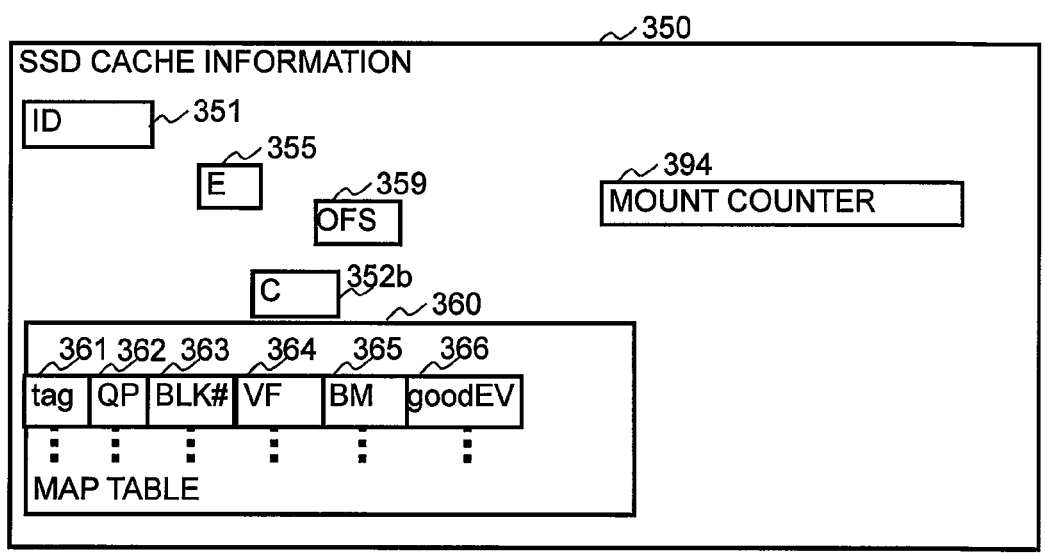
FIG. 37 shows SSD cache information 350 related to the Embodiment 6.

FIG. 37 shows SSD cache information 350 related to the Embodiment 6.

According to this figure, unlike the Embodiment 5 (FIG. 34), the information 350 comprises amount counter 394. The mount counter 394 shows the number of application VMs 320 which recognize the internal VOLs to which this information 350 corresponds.

Figure 38:
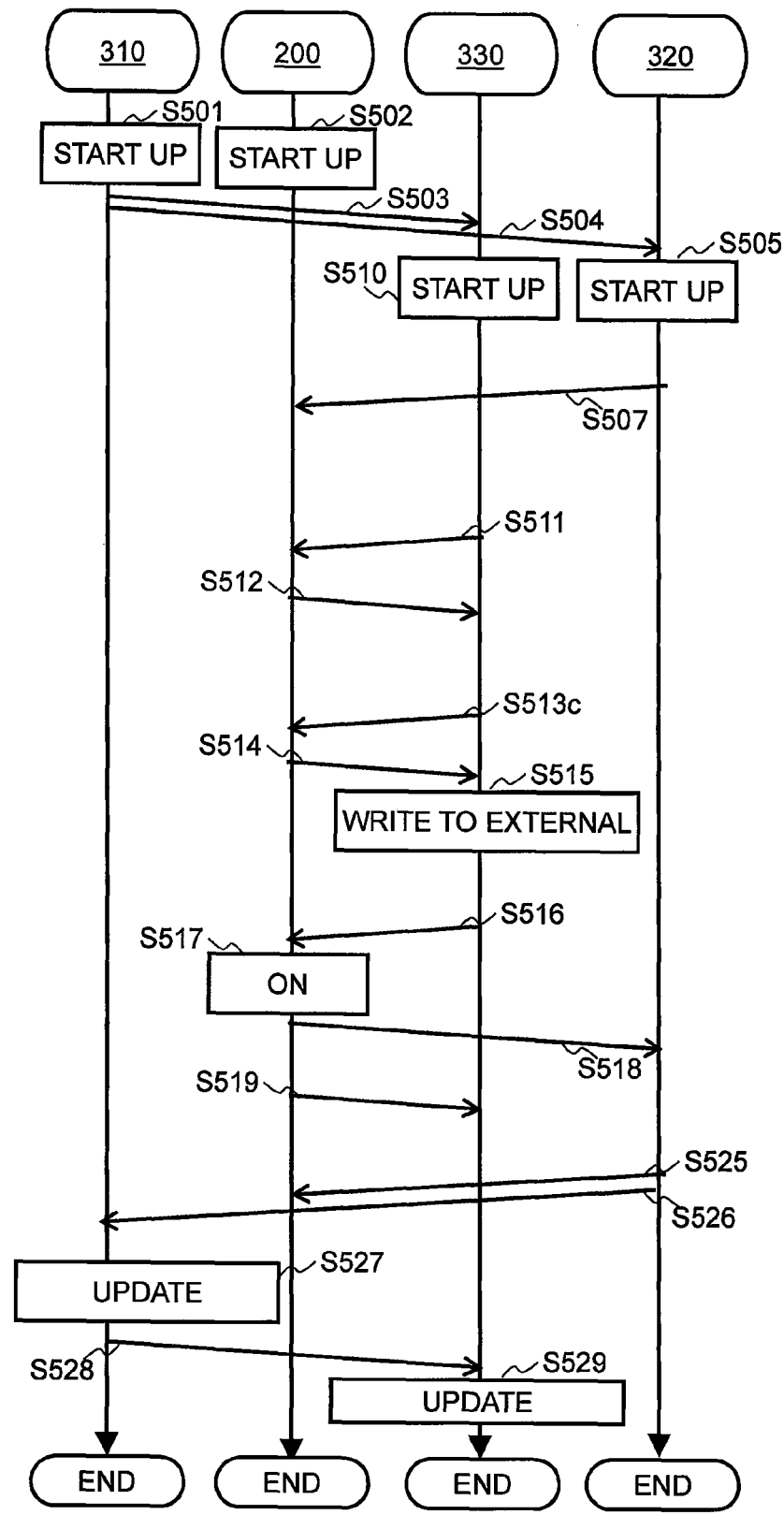
FIG. 38 is a ladder chart showing the start-up processing at the host 100 related to the Embodiment 6.

FIG. 38 is a ladder chart showing the start-up processing at the host 100 related to the Embodiment 6.

According to this figure, unlike the Embodiment 5 (FIG. 30), the steps from S526 to S529 are performed after S525.

At S526, the application VM 320 transmits a mount report including the identifier of the VM 320 (application VM identifier) and the identifier of the mounted internal VOL to the VM control module 310 (S526).

At S527, the VM control module 310 receives the mount report, and adds the application VM identifier and the internal VOL identifier which the mount report comprises to the mount table 312.

At S528, the VM control module 310 transmits a report including the identifier of the mounted internal VOL (the internal VOL identifier which the above-mentioned mount report comprises) to the storage control VM 330.

At S529, the program 332 in the storage control VM 330 receives the report transmitted at S528. The program 332 identifies the SSD cache information 350 comprising the identifier 351 matching the internal VOL identifier which the report comprises. The program 332 updates the mount counter 394 in the identified SSD cache information 350 (for example, increments by one).

Figure 39:
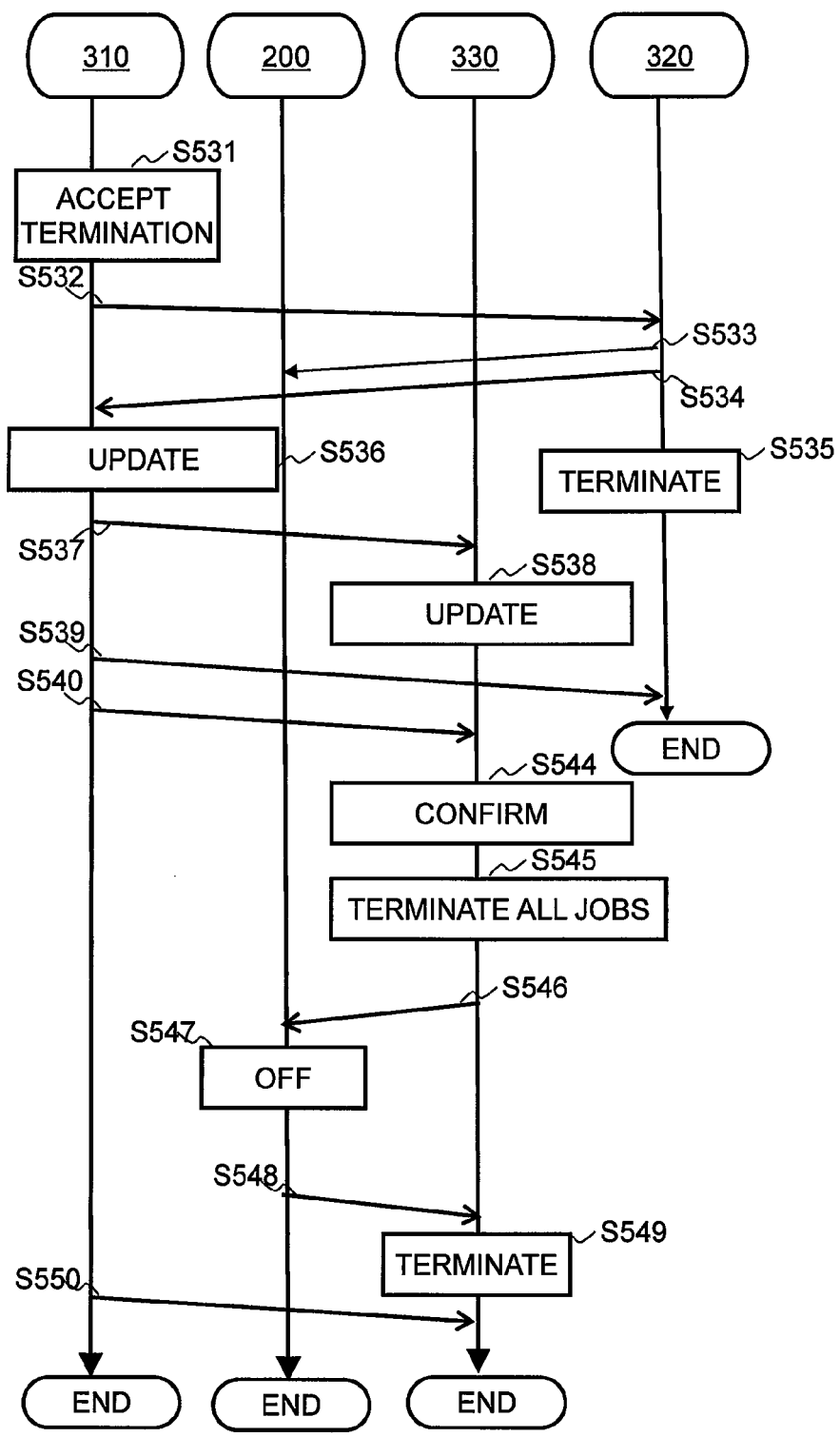
FIG. 39 is a ladder chart showing the termination processing at the host 100 related to the Embodiment 6.

FIG. 39 is a ladder chart showing the termination processing at the host 100 related to the Embodiment 6.

According to this figure, unlike the Embodiment 5 (FIG. 16), S534, S536, S537 and S538 are performed after S533. Furthermore, S544 is performed after S540.

At S534, the application VM 320 transmits an unmount report including the identifiers of all the unmounted internal VOLs to the VM control module 310.

At S536, the VM control module 310 receives an unmount report and deletes the entries including the identifiers matching all the internal VOL identifiers which the report comprises from the mount table 312.

At S537, the VM control module 310 transmits a report including the identifiers of the unmounted internal VOLs to the storage control VM 330.

At S538, the program 332 in the storage control VM 330 receives the report transmitted at S537. The program 332 identifies the SSD cache information 350 comprising the identifiers 351 matching the internal VOL identifiers which the report comprises. The program 332 updates the mount counter 394 in the identified SSD cache information 350 (for example, decrements by one).

At S544, the program 332 in the storage control VM 330 determines whether the mount counters 394 in all the pieces of SSD cache information 350 show 0 or not. As FIG. 39 shows the flow of the case in which the mount counters 394 in all the pieces of SSD cache information 350 show 0, the result of the determination at S544 is positive. Therefore, as shown at S549, the storage control VM 330 is terminated.

Figure 40:
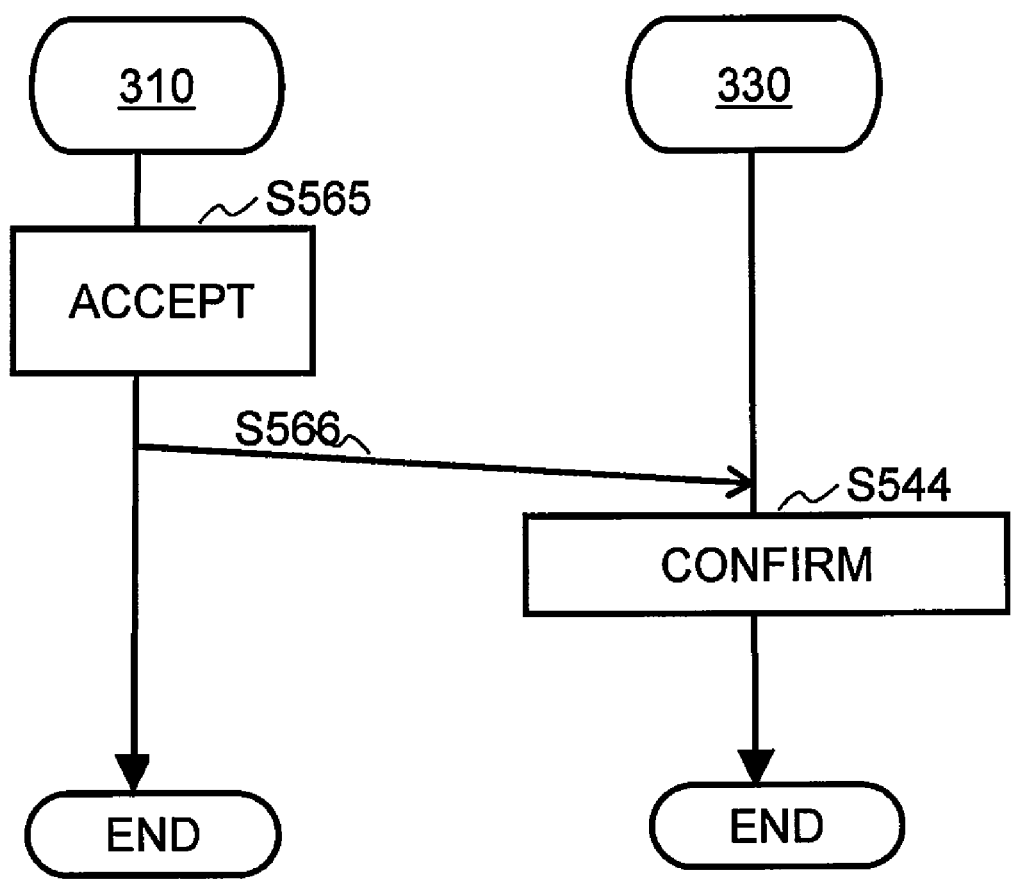
FIG. 40 is a ladder chart showing the abnormal termination processing (abnormal termination processing performed if no unmount is reported from an application VM 320) related to the Embodiment 6.

FIG. 40 is a ladder chart showing the abnormal termination processing performed if no unmount is reported from an application VM 320.

The VM control module 310, if receiving a requirement for termination of the storage control VM 330 from the administrator or others (S565), issues a termination requirement to the storage control VM 330 (S566).

The program 332 in the storage control VM 330 determines whether the mount counters 394 in all the pieces of SSD cache information 350 show 0 or not (S544). As at least one mount counter 394 shows the value which is not 0 in FIG. 40, the result of the determination at S544 is negative. Therefore, S549 of FIG. 39 is not performed. That is, the storage control VM 330 is not terminated (termination of the storage control VM 330 fails).

Figure 41:
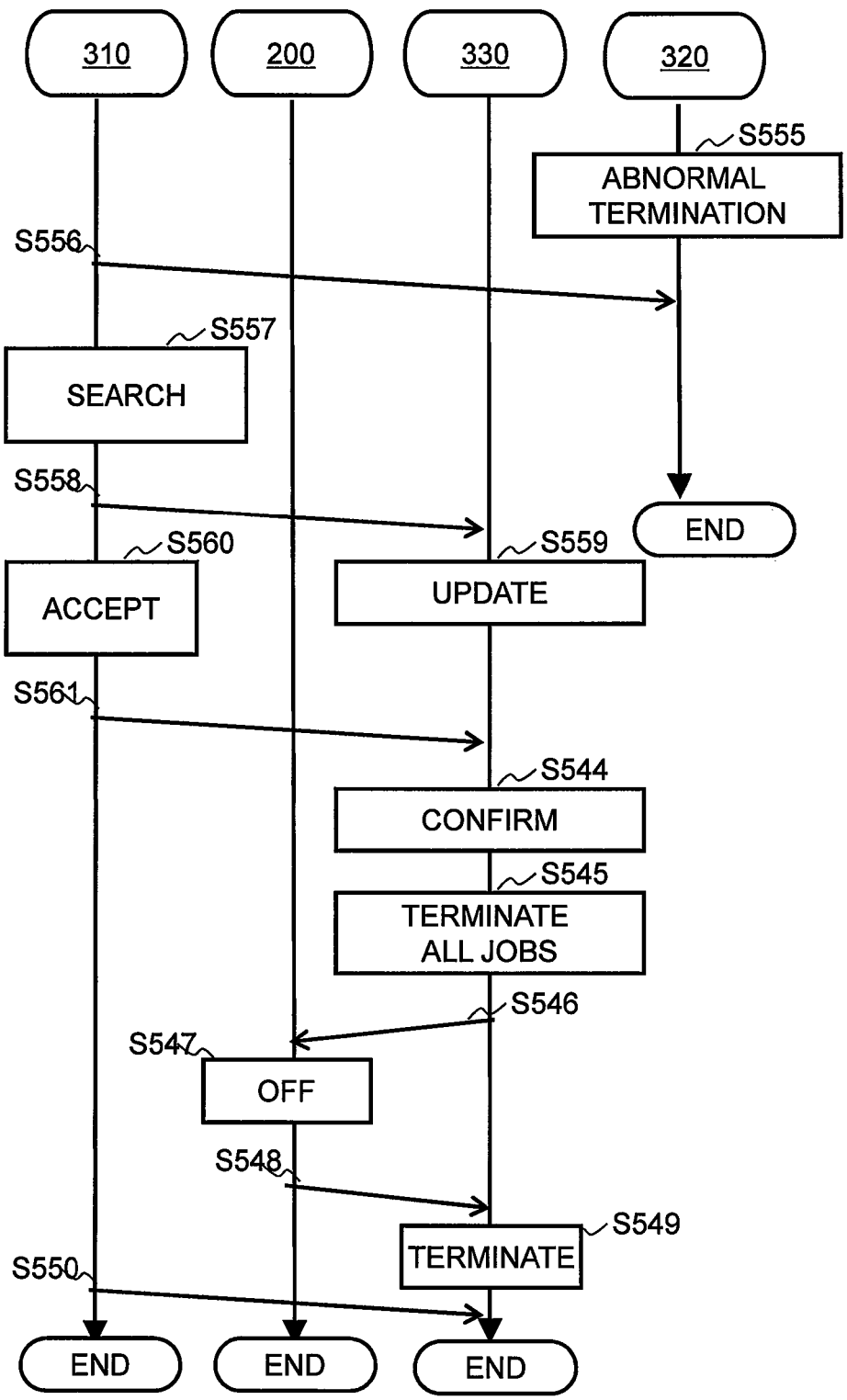
FIG. 41 is a ladder chart showing the termination processing (termination processing at the host 100 where the application VM 320 is abnormally terminated) related to the Embodiment 6.

FIG. 41 is a ladder chart showing the termination processing at the host 100 where the application VM 320 is abnormally terminated.

If the application VM 320 is terminated due to some type of abnormality (S555), the VM control module 310 detects the termination of the application VM 320 (S556). Then, the module 310, with reference to the mount table 312, identifies the entry including the identifier of the terminated application VM 320 (S557). The module 310 transmits an unmount report including the internal VOL identifier in the identified entry to the storage control VM 330 (S558).

The program 332 in the storage control VM 330 receives the unmount report, and updates the mount counter 394 in the SSD cache information 350 including the identifier 351 matching the internal VOL identifier which the unmount report comprises (for example, decrements by one).

After that, the VM control module 310, if receiving a requirement for termination of the system (S560), issues a termination requirement to the storage control VM 330 (S561). After that, by the same processing as S544 and later in FIG. 39, the system is terminated.

Figure 42:
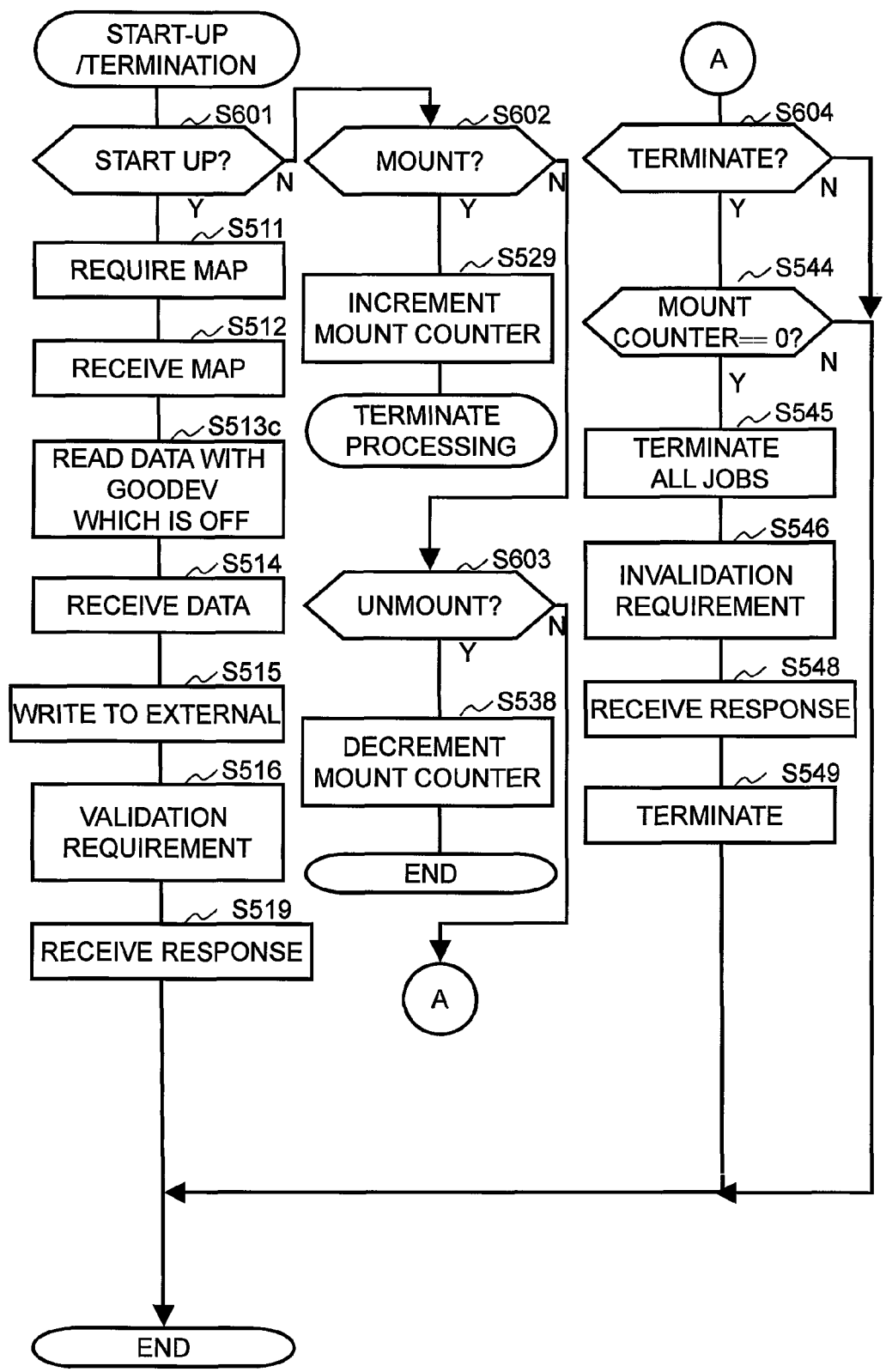
FIG. 42 is a flowchart showing a processing performed by the start-up/termination control program 332 related to the Embodiment 6.

FIG. 42 is a flowchart showing a processing performed by the start-up/termination control program 332 related to the Embodiment 6.

According to this figure, unlike the Embodiment 5 (FIG. 31), S602, S529, S603, S538 and S544 are performed. S602 and S603 are the analysis processing of requirements. As the processing of S529, S538 and S544 is the same as in FIG. 39, the description is omitted.

According to the destination at S544, it can be assumed that the storage control VM 330 is not terminated until there is no more application VM 320 which mounts internal VOLs (indirectly, external VOLs). Therefore, failures due to false termination of the storage control VM 330 can be avoided.

Embodiment 7

Figure 43:
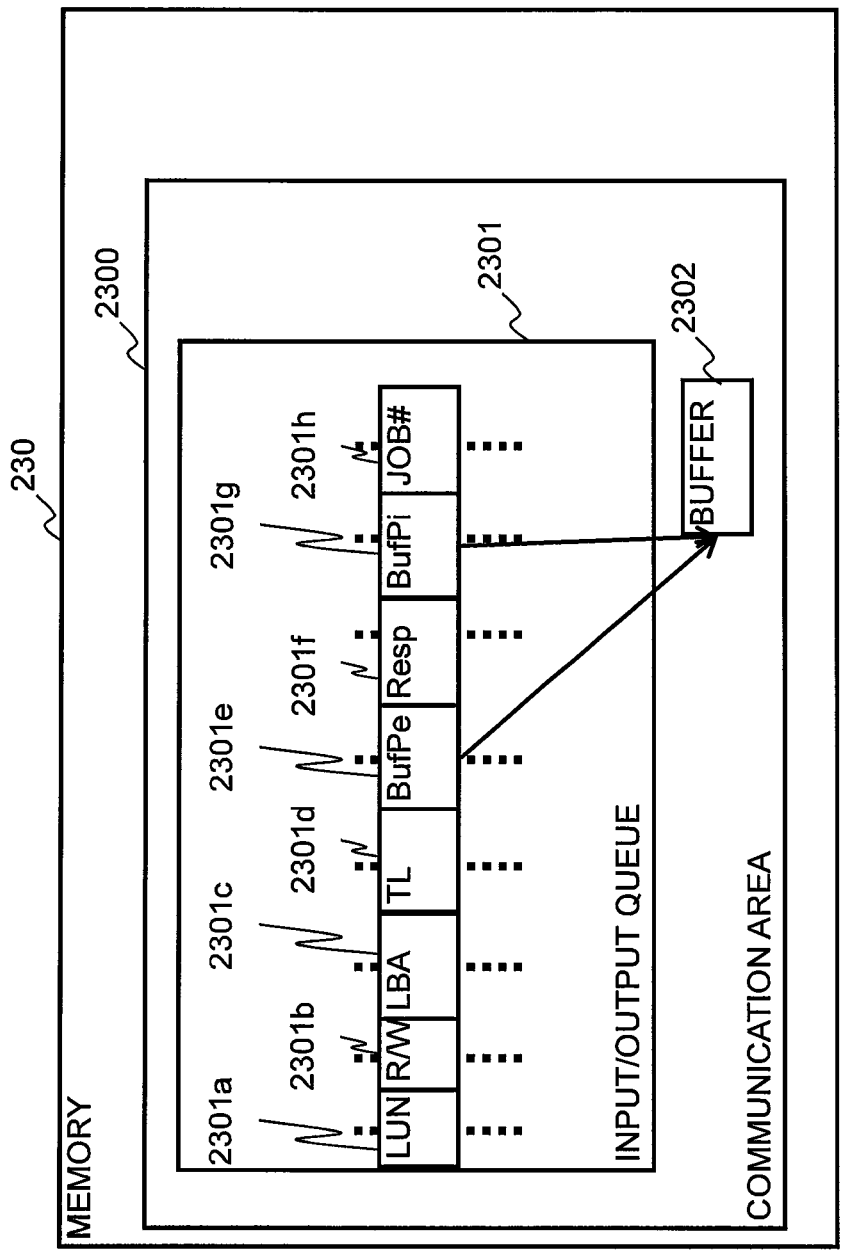
FIG. 43 is a diagram of a communication method (a communication method between the cache SSD 200 and the storage control VM 330) related to the Embodiment 7.

Next, using FIG. 43, the Embodiment 7 is described. As the parts other than FIG. 43 are the same as the Embodiment 6, the description of the same is omitted. Note that the Embodiment 7 may be permitted to lack at least one characteristic of the Embodiments 1 to 6.

FIG. 43 is a diagram of a communication method (a communication method between the cache SSD 200 and the storage control VM 330) related to the Embodiment 7.

Though the communication between the cache SSD 200 and the storage control VM 330 may also be permitted to be performed in accordance with the SCSI (Small Computer System Interface) protocol, in this embodiment, as shown in FIG. 43, the memory 230 in the cache SSD 200 comprises the area 2300 to which the storage control VM 330 can refer (hereinafter referred to as a communication area), and the communication is performed via the communication area 2300.

The communication area 2300 comprises an input/output queue 2301 and a buffer 2302.

The buffer 2302 stores information transmitted to/from the storage control VM 330. The information is, for example, access requests to the storage control VM 330 (for example, read requests or write requests) and the data complying with the access requests (write target data and read target data).

The input/output queue 2301 is the queue comprising pointers for the buffer 2302 for the storage control VM 330 to write responses to the requests (normal or abnormal). In this example, the input/output queue 2301 is one queue, but the configuration may be permitted to be multiple queues, such as separated queues for input and output.

The input/output queue 2301 comprises the LUN 2301a, the request type 2301b, the LBA 2301c, the transfer length 2301d, the buffer external address 2301e, the contents of the response 2301f, the buffer internal address 2301g, and the JOB number 2301h.

The LUN 2301a shows the identifier of the internal VOL of the cache SSD 200 as the source of the request.

The request type 2301b shows whether the request is read or write for the external VOL.

The LBA 2301c is the access destination address, and the transfer length 2301d is the size of the accessed data. Therefore, by these pieces of the information 2301c and 2301d, the access range in the internal VOL is shown.

Both the buffer external address 2301e and the buffer internal address 2301g are the pointers indicating the buffer 2302. The buffer external address 2301e shows the address seen from the storage control VM 330 (the address of the buffer 2302 which the VM 330 can specify), and the buffer internal address 2301g shows the address seen from the cache SSD 200 (the address of the buffer 2302 which the cache SSD 200 can specify).

The contents of the response 2301f show the contents of the response to the request.

The JOB number 2301h is the identifier of the job corresponding to the processing for which the request was issued.

At S135 in FIG. 7 or at S175 in FIG. 10, the program 241 in the SSD 200 saves the buffer 2302, writes the information from 2301a to 2301h except the contents of the response 2301f, and reports the interrupt to the storage control VM 330.

At S304 in FIG. 11, the program 333 in the VM 330, with reference to the information from 2301a to 2301d, analyzes the request from the SSD 200.

At S313 in FIG. 12, the program 333 in the VM 330 writes the data read from the external VOL to the area shown by the buffer external address 2301e (the area in the buffer 2302).

At S321 in FIG. 12 or at S351 in FIG. 13, the program 333 in the VM 330 writes the information showing normal or abnormal as the contents of the response 2301f.

At S340 in FIG. 13, the program 333 in the VM 330 reads the data to be written to the external VOL from the area shown by the buffer external address 2301e (the area in the buffer 2302).

At S137 in FIG. 7 or at S177 in FIG. 10, the program 241 in the SSD 200 refers to the contents of the response 2301f.

At S139 in FIG. 7, the program 241 in the SSD 200 reads the data from the area shown by the buffer internal address 2301g (the area in the buffer 2302), and writes the data to the corresponding physical block (physical block in the FM 210).

According to the Embodiment 7, compared with the case of using the SCSI protocol, the processing of the CPU 215 in the SSD 200 can be simplified, and therefore, the performance improvement and the cost reduction of the cache SSD 200 can be attempted.

Though some of the embodiments of this invention were described above, this invention is by no means limited to any particular embodiments herein disclosed, and obviously comprises any changes or modifications within the spirit and scope hereof.

REFERENCE SIGN LIST

100 Host device

The invention claimed is:

1. A storage controller coupled to an external storage apparatus, comprising:
a cache storage, which is a cache of the external storage apparatus; and
a control processor coupled to the cache storage,
wherein the control processor has an internal access function of accessing the cache storage by executing a first program,
wherein the control processor has an external access function of accessing the external storage apparatus by executing a second program,
wherein the cache storage has:
a physical storage device; and
a cache processor coupled to the physical storage device, wherein the internal access function transmits a read command to the cache storage, wherein the cache processor performs a cache hit/miss determination to determine whether data to be read according to the read command is stored in the physical storage device or not, wherein, when the result of the cache hit/miss determination is negative, the external access function is executed by allowing the cache processor to transmit a read request issued to the external storage apparatus, wherein, when the result of the cache hit/miss determination is positive, the external access function is not executed and the cache processor transmits the data to be read within the physical storage device to the internal access function without issuing the read request to the external storage apparatus, wherein the control processor has a management function of managing the internal access function and the external access function by executing a third program, wherein the internal access function is executed by a first virtual machine, wherein the external access function is a second virtual machine for controlling the first virtual machine, and wherein the management function is a hypervisor for controlling the activation and end of the first virtual machine, as well as the activation and end of the second virtual machine.

2. The storage controller according to claim 1, wherein an internal VOL, which is a logical volume based on the physical storage device, is recognized by the internal access function, wherein an external VOL, which is a logical volume provided by the external storage apparatus, is associated with the internal VOL, and wherein, when the result of the cache hit/miss determination is negative, the external access function reads the data to be read, from the external VOL associated with the internal VOL designated by the read command, in response to the read request, and writes the data into the internal VOL, and then the cache processor provides the data to be read within the internal VOL to the internal access function.

3. The storage controller according to claim 2, wherein the internal access function transmits, to the cache storage, an inquiry about the presence of the internal VOL, and wherein, when the inquiry is received, the cache processor notifies the internal access function of the presence of the internal VOL when the external access function is already activated, but does not notify the internal access function of the presence of the internal VOL when the external access function is not activated.

4. The storage controller according to claim 2, wherein a plurality of the internal VOLs are associated with one external VOL, a storage capacity of the external VOL is equal to the sum of actual capacities of the plurality of the internal VOLs, and wherein the actual capacities of the internal VOLs are a storage capacity of a physical storage region which is a base of the internal VOL of the physical storage device.

5. The storage controller according to claim 2, wherein the internal access function transmits a write command designating the internal VOL to the cache storage, wherein the cache processor writes data to be written according to the write command, into the internal VOL in response to the write command, wherein the cache processor transmits, to the external access function, a write request for writing the data to be written within the internal VOL, into the external VOL, and wherein the external access function writes the data to be written into the external VOL in response to the write request, and transmits, to the cache storage, a response to the write request when the data to be written is written into the external VOL.

6. The storage controller according to claim 5, wherein the internal VOL is configured by a plurality of logical regions, each of which is configured by a plurality of sub logical regions, and wherein the cache storage manages, for each sub logical region, whether data is written into the internal VOL or not.

7. The storage controller according to claim 6, wherein the size of each of the sub regions is the same as the minimum size of data that is written or read by one write command and one read command issued by the internal access function.

8. The storage controller according to claim 6, wherein the cache processor transmits a response to the write command to the internal access function when the data to be written is written into the internal VOL.

9. The storage controller according to claim 8, wherein the internal VOL is configured by a plurality of logical regions, wherein the physical storage device is configured by a plurality of physical regions, wherein the cache processor manages a response status for each logical region, wherein the response status represents whether a response to the write request is received from the external access function or not, and wherein, when the write command is received, the cache processor specifies a logical region corresponding to the response status representing that the response to the write request is received, and writes the data to be written into a physical region corresponding to this logical region.

10. The storage controller according to claim 8, wherein the internal VOL is configured by a plurality of logical regions, wherein the cache processor manages a response status for each logical region, wherein the response status represents whether a response to the write request is received from the external access function or not, wherein the external access function performs an external reflecting process when the external access function is activated, and wherein, in the external reflecting process, data to be written within a logical region corresponding to the response status indicating that there is no response is written into the external VOL based on the response status of each logical region.

11. The storage controller according to claim 10, wherein the internal access function transmits an inquiry about the presence of the internal VOL to the cache storage, wherein, after the external reflecting process is carried out, the external access function transmits, to the cache storage, an enabling request, which is a request for enabling the internal VOL, and wherein, when the inquiry is received, the cache processor notifies the internal access function of the presence of the internal VOL when the enabling request is already received, but does not notify the internal access function of the presence of the internal VOL when the enabling request is not received.

12. The storage controller according to claim 2,
wherein the internal VOL is configured by a plurality of logical regions,
wherein the physical storage device is configured by a plurality of physical regions,
wherein the internal VOL includes a primary internal VOL and a secondary internal VOL,
wherein the external access function or the cache processor manages which logical region of the primary internal VOL corresponds to a difference logical region,
wherein the difference logical region is a logical region for storing data that is inconsistent between the primary internal VOL and the secondary internal VOL,
wherein the external access function or the cache processor copies data from the secondary internal VOL to the primary internal VOL for the difference logical region only, the data being copied from the logical regions of the secondary internal VOL corresponding to the difference logical region, to the difference logical region,
wherein, when copying of the data is started, the external access function or the cache processor manages the physical region, as temporary released, corresponding to all of allocated logical regions of the primary internal VOL,
wherein the allocated logical regions being logical regions to which any of the physical regions is allocated,
wherein, when the data is written into the difference logical region in accordance with the copying of the data, the external access function or the cache processor manages the physical region, as unreleased, corresponding to this difference logical region, and
wherein, when the physical region corresponding to a read-source logical region according to a read command from the internal access function is managed as unreleased, the cache processor provides the internal access function with data of this physical region,
wherein, when copying of the data is ended, the external access function or the cache processor manages the physical region in the primary internal VOL, as unreleased, which is managed as temporary released.

13. The storage controller according to claim 2,
wherein the internal access function exists in plurality; and
wherein, when an termination requirement is received, the external access function does not end, unless the number of internal access functions recognizing the internal VOL becomes zero.

14. The storage controller according to claim 1,
wherein the cache storage has a communication region, which is a storage region for communications; and
wherein a communication between the external access function and the cache processor is carried out by the communication region.

* * * * *